United States Patent
Nolan et al.

(10) Patent No.: US 6,640,278 B1
(45) Date of Patent: Oct. 28, 2003

(54) METHOD FOR CONFIGURATION AND MANAGEMENT OF STORAGE RESOURCES IN A STORAGE NETWORK

(75) Inventors: Shari J. Nolan, San Jose, CA (US); Jeffrey S. Nespor, Pleasanton, CA (US); George W. Harris, Jr., Mountain View, CA (US); Jerry Parker Lane, San Jose, CA (US); Alan R. Merrell, Fremont, CA (US); Richard A. Lagueux, Jr., Hudson, NH (US); Michael G. Panas, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/482,213

(22) Filed: Jan. 12, 2000

Related U.S. Application Data

(63) Continuation-in-part of application No. 09/347,042, filed on Jul. 2, 1999, now Pat. No. 6,553,408, and a continuation-in-part of application No. 09/276,428, filed on Mar. 25, 1999, now Pat. No. 6,446,141.

(51) Int. Cl.⁷ .......................... G06F 12/00; G06F 15/16; G06F 17/30
(52) U.S. Cl. .......................... 711/6; 709/203; 709/223; 707/1; 707/10; 707/102
(58) Field of Search .............................. 711/6; 709/223, 709/203; 707/1, 10, 102

(56) References Cited

U.S. PATENT DOCUMENTS

| | | | | |
|---|---|---|---|---|
| 5,163,131 A | * | 11/1992 | Row et al. ................... 709/202 |
| 5,239,648 A | * | 8/1993 | Nukui ........................ 707/10 |
| 5,271,007 A | * | 12/1993 | Kurahashi et al. .......... 370/351 |
| 5,537,585 A | * | 7/1996 | Blickenstaff et al. ....... 707/205 |
| 5,678,042 A | * | 10/1997 | Pisello et al. ................ 714/47 |
| 5,802,366 A | * | 9/1998 | Row et al. ................... 709/250 |
| 5,857,206 A | * | 1/1999 | Tsutsumitake .............. 707/203 |
| 5,956,716 A | * | 9/1999 | Kenner et al. ............... 707/10 |
| 6,029,168 A | * | 2/2000 | Frey ........................... 707/10 |
| 6,148,414 A | * | 11/2000 | Brown et al. ................. 714/9 |
| 6,212,520 B1 | * | 4/2001 | Maruyama et al. .......... 707/10 |
| 6,236,996 B1 | * | 5/2001 | Bapat et al. .................. 707/9 |
| 6,311,213 B2 | * | 10/2001 | Dawson et al. ............. 709/217 |
| 6,327,614 B1 | * | 12/2001 | Asano et al. ............... 709/213 |
| 6,415,289 B1 | * | 7/2002 | Williams et al. ............. 707/10 |
| 6,516,350 B1 | * | 2/2003 | Lumelsky et al. .......... 709/226 |
| 6,538,669 B1 | * | 3/2003 | Lagueux et al. ............ 345/764 |

FOREIGN PATENT DOCUMENTS

| | | |
|---|---|---|
| WO | WO 99/34297 | 7/1999 |
| WO | WO 00/52576 | 9/2000 |

OTHER PUBLICATIONS

*SUN Enterprise Volume Manager 2.5 Admin. Guide*—Chapter 1 pp. 1–1 to 1–15 Copyright 1997.

* cited by examiner

Primary Examiner—Krisna Lim
(74) Attorney, Agent, or Firm—Hamilton & Terrile, LLP; Stephen A. Terrile

(57) ABSTRACT

A storage domain management system supports storage domains. The storage server includes a plurality of communication interfaces. A first set of communication interfaces in the plurality is adapted for connection to all kinds of users of data. A second set of communication interfaces in the plurality is adapted for connection to respective devices in a pool of storage devices for use in a storage domain. Data processing resources in the server are coupled to the plurality of communication interfaces for transferring data among the interfaces. The data processing resources comprise a plurality of driver modules and configurable logic linking driver modules into data paths. Each configured data path acts as a virtual circuit that includes a set of driver modules selected from the plurality of driver modules. A data storage transaction which is received at a communication interface is mapped to one of the configured data paths. A display and a user input device are included with data processing structures to manage images displayed on the display.

10 Claims, 26 Drawing Sheets

Host Manager

File  Actions  Help

| Add New Host 1458 | Change Host 1459 | Delete Host 1460 |

| Host Name 1452 | NIC 1456 | Port 1453 | Initiator ID 1454 | Description 1455 | Unique ID 1457 |
|---|---|---|---|---|---|
| Host6 | NIC | 2 | 12 | | xyz |
| Host5 | NIC | 1 | 2 | | xya |
| Host7 | NIC | 1 | 3 | | xaz |
| Host8 | NIC | 2 | 13 | | ayz |
| Host1 | NIC | 1 | 0 | | xyb |
| Host2 | NIC | 2 | 10 | | xbz |
| Host4 | NIC | 2 | 11 | | byz |
| Host3 | NIC | 1 | 1 | | xyc |

*FIG. 19*

LUN Map

| Add 1556 | View | Del | Mirror 1557 | Verify | Export |
|---|---|---|---|---|---|
Actions

| Name 1551 | Exported 1552 | Host 1553 | Storage 1554 | Description 1555 |
|---|---|---|---|---|
| Payroll | ☐ | Host5 | 18.0GB Mirror | Oracle database of payroll |
| Accounts | ☑ | Host7 | 15.0GB Mirror | Corporate accounts |
| Orders | ☐ | Host1 | 33.33GB Part of 100.0GB ... | unfilled orders |
| Blackmail | ☐ | Host4 | 30.0GB Stripe | secrets used to keep troublesome customers in l... |
| Customers | ☐ | Host6 | 18.0GB Mirror | Customer list |
| Inventory | ☐ | Host2 | 30.0GB Stripe | Oracle database of all inventor |
| Sales | ☐ | Host8 | 66.67GB Part of 100.0GB ... | Potential sales leads |
| Hit List | ☐ | Host3 | 15.0GB Stripe | troublesome customers that refuse to be blackm... |
| P/L (IRS) | ☐ | Host6 | 500.0GB External LUN | Profit/Loss items |
| P/L (real) | ☐ | Host5 | 250.0GB External LUN | Actual profit loss items |

*FIG. 23* new LUN Map Entry

LUN Name: _1601_

Description: _1602_

Server Info
- SCSI Target ID: _1603_
- Exported LUN: _1604_

Virtual Circuit
- Host: Host6 _1605_
- Storage: 100.0GB Mirror _1606_
  - ☑ Use Cache _1607_

[OK] [Cancel]

METHOD FOR CONFIGURATION AND MANAGEMENT OF STORAGE RESOURCES IN A STORAGE NETWORK

RELATED APPLICATION REFERENCE

The present application is a continuation-in-part of prior, Ser. No. 09/276,428 now U.S. Pat. No 6,446,141 entitled Storage Server System Including Ranking of Data Source, invented by Shari J. Nolan, Jeffrey S. Nespor, George W. Harris Jr., Jerry Parker Lane, and Alan R Merrell, filed Mar. 25, 1999 issued Sep. 3, 2002; and a continuation-in-part Ser. No. 09/347,042 now of U.S. Pat. No. 6,553,408, entitled Virtual Device Architecture Having Memory for Storage Lists of Driver Modules, invented by Alan Merrell, Joseph Altmaier, Jerry Parker Lane and Michael G. Panas, filed Jul. 2, 1999 issued Apr. 22, 2003, and such patents are incorporated by reference as if fully set forth herein.

The present invention is related to U.S. Pat. No. 6,538,669, entitled Graphical User Interface for Configuration of a Storage System, invented by Richard A. Lagueux, Jr., Joel H. Stave, John B. Yeaman, Brian E. Stevens, Robert M. Higgins, and James M. Collins, issued Mar. 25, 2003, which patent is owned by Dell Products L.P.

BACKGROUND OF THE INVENTION

1. Field of the Invention

This invention relates to the field of mass storage systems. In particular, the invention relates to the management of storage transactions in, and the configuration of, intelligent storage area networks.

2. Description of the Related Art

The storage of large amounts of data in so-called mass storage systems is becoming a common practice. Mass storage systems typically include storage devices coupled to file servers on data networks. Users in the network communicate with the file servers for access to the data. The file servers are typically connected to specific storage devices via data channels. The data channels are usually implemented with point-to-point communication protocols designed for managing storage transactions.

As the amount of storage increases, and the number of file servers in communication networks grows, the concept of a storage area network (SAN) has arisen. Storage area networks connect a number of mass storage systems in a communication network which is optimized for storage transactions. For example, fibre channel arbitrated loop (FC-AL) networks are being implemented as SANs. The SANs support many point-to-point communication sessions between users of the storage systems and the specific storage systems on the SAN.

File servers and other users of the storage systems are configured to communicate with specific storage media. As the storage systems expand or media is replaced in the system, reconfiguration is required at the file servers and other users. Also, if a need arises to move the data from one device to another, in a so-called data migration operation, it is often necessary to block access to the data during the migration process. After migration is complete, reconfiguration at the user system must be executed to make the data available from the new device.

Overall, as the complexity and size of storage systems and networks increase, the problems of managing configuration of the users of the data and of the storage systems themselves multiply. Accordingly, there is a need for systems that simplify management of storage systems, while taking advantage of the flexibility and power of the SAN architecture.

SUMMARY OF THE INVENTION

The present invention provides systems and methods for storage domain management. Storage domain management is a centralized and secure management capability that layers on top of existing storage area network hardware infrastructures to provide high-performance, high availability and advanced storage management functionality for heterogeneous environments. Storage domain management provides a core of a robust storage area network fabric that can integrate legacy and new equipment, off-load network and storage management tasks from the servers and storage resources, and host network-based applications so that they can be leveraged across all components of the storage area network. Storage domain management allows for the creation and optimization of a heterogeneous storage area network environment not available using prior art systems and techniques.

The present invention provides a system for managing storage resources in a storage network according to storage domains. The system includes a plurality of communication interfaces, adapted for connection via communication media to clients and storage systems and the storage network. A processing unit is coupled with the plurality of communication interfaces and includes logic to configure a set of storage locations from the one or more storage systems in the network as a storage domain for a set of at least one client from the one or more clients in the storage network. The system includes in various combinations elements providing multi-protocol support across the plurality of communication interfaces, logic to route storage transactions within a storage domain in response to the transaction identifiers carried within the protocols, a management interface for configuring the storage domains, logic for translating a storage transaction traversing the plurality of communication interfaces into and out of a common format for routing within the system among the plurality of communication interfaces, resources for caching the data subject of storage transactions, and logic to manage the migration of data sets from one storage location to another storage location within the network.

In one embodiment, the system according to the present invention is included as an intermediate device in a storage area network, between client processors, such as file servers, and storage systems used as storage resources in a storage domain for the clients. Storage transactions are received by the intermediate device, and managed according to the configuration of the storage domain defined by configuration logic in the intermediate device. The intermediate device provides a management site within a storage area network that allows for flexible configuration, redundancy, failover, data migration, caching, and support of multiple protocols. Furthermore, an intermediate device in one embodiment provides emulation of legacy systems, allowing the storage domain to include a legacy storage device for the client without a requirement for reconfiguration of the client.

Storage domains are managed by assigning a logical storage extent to clients within the network, and by mapping storage resources in the network to the logical storage extents of the clients. The assignment of logical storage extents to clients is accomplished by the mapping in an intermediate system, or other system logically independent of, or isolated from, the client of storage resources in the network to the logical storage extent assigned to the client. In this manner, a storage domain of storage resources accessible via a storage domain manager is managed using the storage domain manager as the intermediate device.

In a preferred embodiment, the resources within storage domains are defined using virtual circuits which comprise a plurality of driver modules and configurable logic linking driver modules into data paths, which are implemented in pairs for redundancy in a preferred system. Each configured data path acts as a virtual circuit that includes a set of driver modules selected from the plurality of driver modules. A data storage transaction which is received at a communication interface is mapped to one of the configured data paths, and thereby controlled within a storage domain managed and configured in the storage domain manager.

Fundamentally, storage domain management enables customers to realize the full promise of storage area networks to address business problems. The storage domain management platform provides for heterogeneous interoperability of storage systems and protocols, provides for secure centralized management, provides for scalability and high performance, and provides for reliability, availability and serviceability features, all on an intelligent, purpose-built platform.

Other aspects and advantages of the present invention can be seen on review of the figures, the detailed description and the claims which follow.

BRIEF DESCRIPTION OF THE FIGURES

FIG. 19 illustrates an image used for prompting a user to add or modify a host configuration according to the present invention.

FIG. 23 illustrates an image used for creating virtual circuits, and mapping logical addresses to virtual circuits according to the present invention.

FIG. 24 illustrates a dialog box for creating a map entry, which is opened using the image of FIG. 23.

DETAILED DESCRIPTION

Overview

Figure 1:
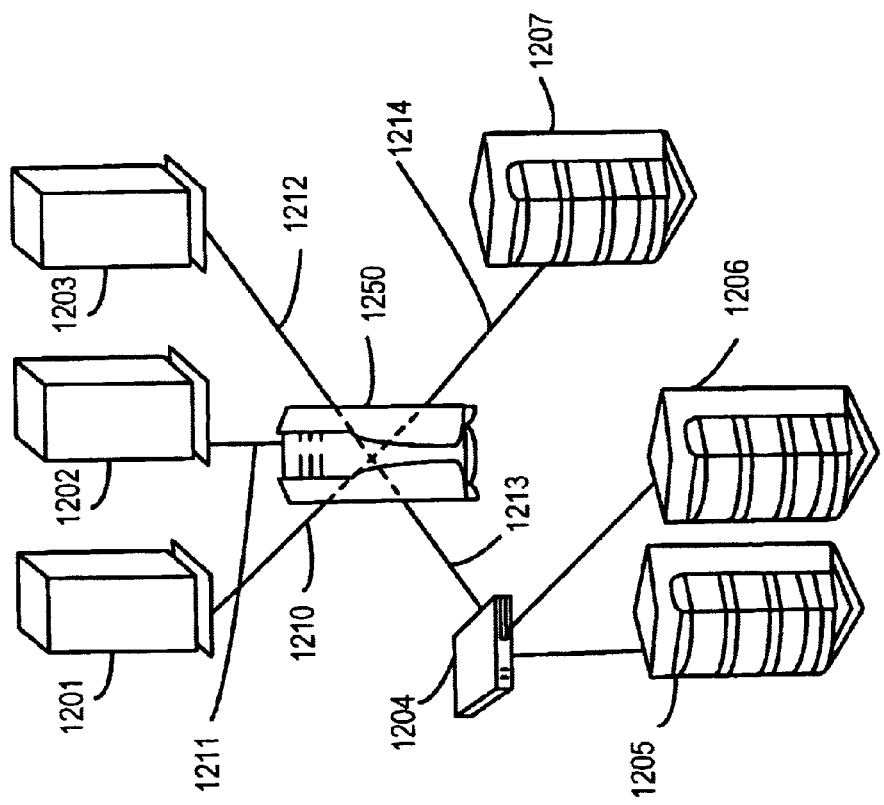
FIG. 1 illustrates a storage area network having a storage server according to the present invention configured as a storage router or a storage director of management of a storage domain.

FIG. 1 illustrates a network including intelligent storage area network (ISAN) server 1200 providing storage domain management. A storage area network (SAN) can be used to provide data storage services for client computers. A storage area network is optimized to provide high bandwidth and high throughput storage for client computers such as file servers, web servers and end user computers. A storage server 1200, according to the present invention, in preferred embodiments provides on-chassis data storage, storage transaction cache service, storage routing and virtual device management.

The storage server 1200 in the network has client interfaces 1210, 1211, 1212 coupled to client servers 1201, 1202, and 1203, respectively. Storage interfaces 1213 and 1214 are coupled via communication channels to storage devices 1205, 1206, 1207 which, when combined with any storage in the storage server 1200, provide physical storage for a storage domain managed in the storage server 1200. The communication channel 1213 in this example is connected through a hub 1204 to the devices 1205 and 1206. In operation, the client interfaces operate according to protocol by which the client servers requests storage transactions by commands which carry parameters sufficient for storage domain identification, including for example an identifier of an initiator, a logical extent such as a LUN number, and an identifier of a target device. The storage server 1200 maps in the requested transaction to a virtual device, which in turn allocates physical storage for use in the transaction from among the physical storage devices. The storage server 1200 also includes resources that emulate the target physical device identified in the request. The storage server 1200 is able to direct storage transactions using local configuration data, and simplify the management of storage for the client servers.

To provide the highest throughput, the storage server 1200 is coupled to the client servers to 1201–1203 by high speed network media, such as a fibre channel or gigabit ethernet. The client servers 1201–1203 are coupled in typical configurations to end user computers by network links.

FIG. 1 illustrates a management interface 108 coupled to server 1200 via communication link 109. The communication link, served by interfaces in the station 108 and in the server 1200, comprises for example, an Ethernet network link, a serial cable coupled to serial ports, or an internal bus interface in various embodiments.

Communication between the servers 1201–1203 and the storage devices 1205–1207 is provided via a fibre channel arbitrated loop network through the storage server 1200 as an intermediate device. The channels over FC-AL can be accomplished using a protocol compliant with the standard small computer system interface version 3 (SCSI-3) preferably using a fibre channel medium, also termed fibre channel protocol (FCP) (e.g., SCSI-X3T10 and FCP X3.269-199X). In other embodiments, protocols such as the Internet Protocol are used over the fibre channel fabric carrying storage transactions in a variety of protocols. In some embodiments, the storage server 1200 supports multiple protocols for the data storage transactions.

Figure 2:
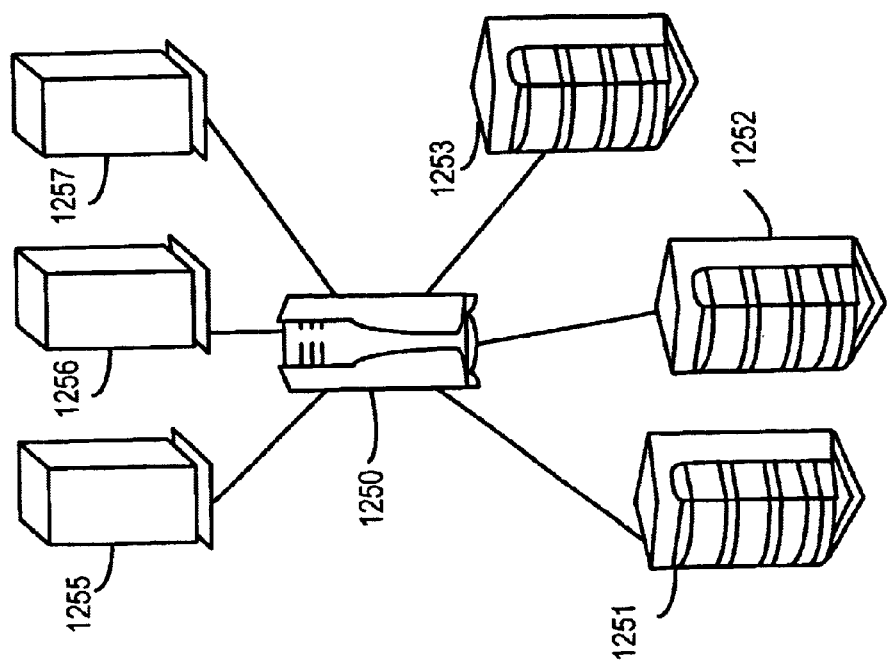
FIG. 2 illustrates a storage area network in an alternative configuration having a storage server according to the present invention configured as a storage router or a storage director in storage domain management in a heterogeneous network.

FIG. 2 illustrates another embodiment of a storage area network. In FIG. 2, a server 1250 which includes storage director logic and cache memory as discussed above, is coupled to client servers on a variety of different platforms, including a Hewlett-Packard server 1255, a Sun server 1256, and an SGI server 1257, each of which may be executing different protocols for management of storage transactions. A plurality of physical storage devices making up the physical resources for use as a storage domain, is also coupled to the server 1250 and managed by the storage director according to the virtual device architecture described above. The plurality of physical storage devices in this example include storage on a Hewlett-Packard platform 1251, storage on a Sun platform 1252 and storage on an EMC platform 1253. Thus, the server, including storage director logic, allows creation of a shared storage pool that can support legacy servers and storage in a heterogeneous environment. Incompatibilities among the plural storage devices and servers can be masked or mimicked as needed using the virtual device architecture. True storage area network environments can be implemented and all host, fabric and storage interoperability issues can be managed at the storage server level.

The storage director logic utilizing the virtual device architecture provides a single intelligent coordination point for the configuration of client server access to storage using storage domain configurations. Little or no hardware reconfiguration is necessary in adding new devices or changing management of existing devices. The configuration of the storage server provides accurate configuration information and control by allowing automatic maintenance of the mapping of data sets in physical storage to servers. Maintaining accurate maps of physical storage simplifies management of storage area networks significantly. Also, the storage director at the server provides for active migration of data from old storage devices to new storage devices while the devices remain online. In addition, storage objects are no longer limited in size by the size of the largest object that can be created in an array. Multiple arrays can be concatenated into a single storage object independently of host operating systems running on client servers. The storage director can also manage backup and testing operations such as making snapshots of data in the non-volatile cache, and for managing data backup by copying data from disk to tape, for example, without being routed through the client server. Furthermore, the local cache can be used to migrate data from arrays that have lost redundancy and to repair redundant storage and maintain full availability of data while an array is being repaired or rebuilt. For applications having multiple servers accessing a common data set, locking logic can be placed in the storage server in a manner which provides a simple scalable solution using the virtual device architecture.

The storage director logic in the storage server operates to consolidate caching requirements from both servers and storage to reduce the total amount of cache memory required for a storage area network. The system is able to allocate more cache to either the client server or storage system than either can effectively provide as internal memory. Further, the cache can be dynamically or statically allocated as defined for the applications using the system.

Figure 3:
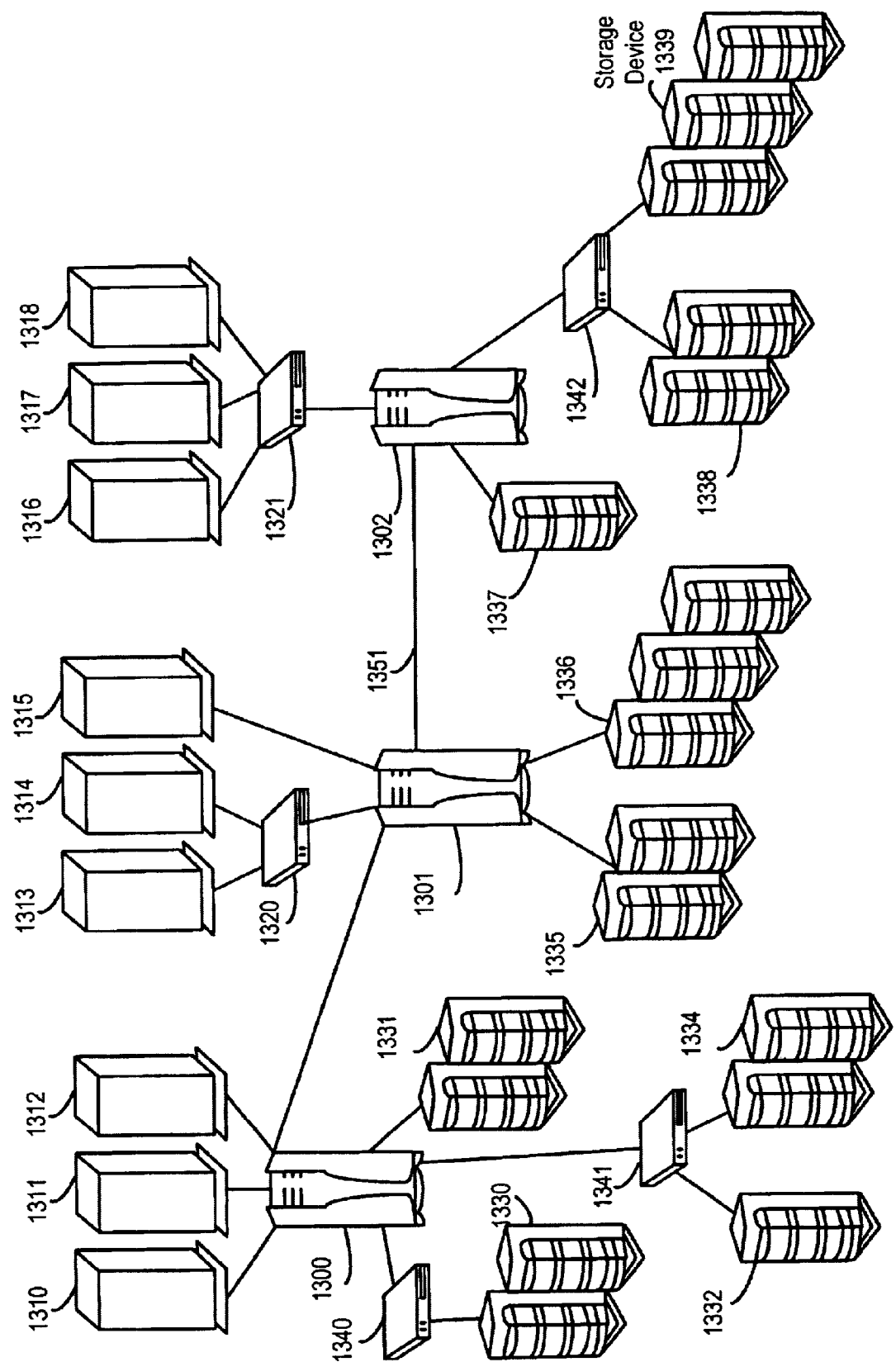
FIG. 3 illustrates a more complex storage area network including several storage servers according to the present invention with direct communication channels between them supporting an extended storage domain, or storage domains.

FIG. 3 illustrates a more rigorous example of a storage area network using a plurality of interconnected storage servers according to the present invention. Storage servers 1300, 1301, and 1302 are included, interconnected by communication channels 1350, 1351 using, for example, a high speed protocol such as fibre channel, Gigabit ethernet, or Asynchronous Transfer Mode (ATM). Each storage server includes storage director logic and non-volatile cache in the preferred embodiment. The storage servers 1300, 1301, and 1302 are coupled to a plurality of client servers 1310 through 1318 in this example. The client servers 1313 and 1314 are connected through a hub 1320 to the storage server 1301. Likewise, the client servers 1316 through 1318 are connected to a hub 1321 which in turn is connected to the storage server 1302. The client servers 1310–1318 communicate with the storage server using storage channel protocols such as FCP described in detail above. According to these protocols, storage transactions are requested, and carry an identifier of the initiator of the request, a logical unit number (LUN), and an identifier of the target storage device. These parameters are used by the storage director logic to map the storage transaction to a virtual device within a storage domain. The servers also include resources to emulate the target storage device so that the client servers smoothly interoperate with the plurality of storage devices in the storage area network.

In FIG. 3, there are a plurality of storage devices 1330 through 1339 illustrated coupled to the storage servers 1300–1302. In the diagram, a variety of symbols are used to represent the storage devices, and to indicate that the network is heterogeneous and can utilize a wide variety of devices managed by the virtual device interfaces at the servers 1301 through 1302. Also, the communication channels can be varied. Thus, hubs 1340, 1341 and 1342 are included in the network to facilitate a variety of communication protocols between the storage devices and the storage servers.

An Intelligent Storage Area Network Server

Figure 4:
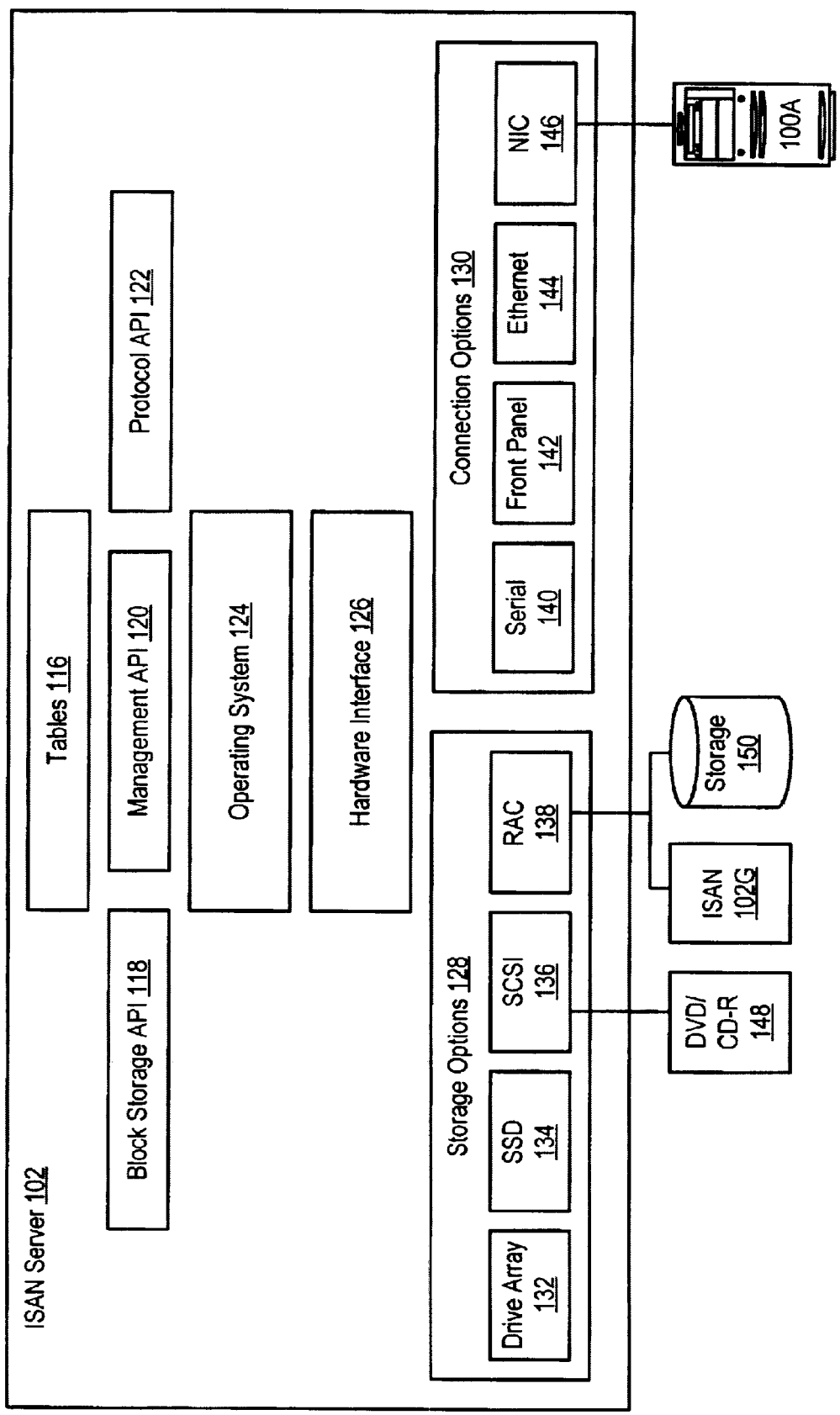
FIG. 4 is a block diagram of a storage server supporting storage domain management according to the present invention.

FIG. 4 is a block diagram of a storage server in one preferred embodiment, which includes storage system management resources according to the present invention.

The storage server 102 has connection options 130 including a set of communication interfaces adapted for users and for other data processing functions, and storage options 128 including a set of communication interfaces adapted for storage devices. The storage server 102 has a hardware interface 126, an operating system 124, a block storage interface 118, a management interface 120, and a protocol interface 122. The connection options 130 include serial connections 140, a front panel connection 142 supporting a configuration management routine in one embodiment, an Ethernet connection 144 supporting communication with a remote management station, and a network interface 146. The storage options 128 include the drive array 132, the solid state drive (SSD) 134, the SCSI interface 136, and the network interface 138. The SCSI interface 136 is coupled to a DVD/CD-R 148. The network interface 138 is coupled to a storage server 102G and/or storage 150.

The connection options 130 are various methods of connecting servers and clients to the storage server 102. The serial connections 140 support network management, modems for remote management, and uninterruptible power supply messages. The front panel connection 142 supports a management connection with the front panel display of the storage server 102. The Ethernet connection 144 supports an Ethernet interface for management protocols and possibly for data transfer. The network interface 146 is one of potentially many high speed interfaces on the server. In some embodiments, the network interface 146 is a fibre channel interface with drivers for a fibre channel arbitrated loop (FC-AL). The network interface 146 may also include drivers for SCSI-3 over the fibre channel medium using fibre channel protocol (FCP).

The hardware interface 126 provides interface specific hardware components. For example, the network interface 146 has a network interface specific set of software modules to support configuration, diagnostics, performance monitoring, and health and status monitoring.

The operating system 124, the tables 116, and the interfaces 118–122 support the virtual device and storage routing functionality of the storage server 102. These components of the storage server 102 route storage transactions among appropriate storage options 128 and the connection options 130 using configured sets of driver modules in the system.

The operating system 124 provides message routing and transport facilities in addition to failsafe facilities. The message routing and transport facilities of the operating system 124 are used to route messages, including storage transactions, between the components of the storage server 102. These messages include messages in the internal format between components of a virtual circuit. These messages can also include control messages in other formats.

The block storage interface 118 provides software modules to support block data transfers. The interface 118 includes support for striped data storage, mirrored data storage, partitioned data storage, memory cache storage, and RAID storage. The different supported storage types can be linked to form various combinations such as a mirrored data storage with a memory cache.

The protocol interface 122 provides software modules for translating and responding to requests in a variety of protocols. One set of modules is provided for the layers of an Ethernet connection: the hardware driver, the data link driver, the Internet protocol (IP) driver, the transmission control protocol (TCP) driver, the user datagram protocol (UDP) driver, and other drivers. Another set of modules provides drivers for FCP.

The management interface 120 provides software modules for managing the storage server 102. The management interface 120 contains interfaces for managing access to the tables 116. The management interface 120 also contains interfaces for rules-based management of the system including: scheduling, or process orchestration; monitoring the system; informed consent management; and handling system processes and events. The informed consent management module is premised on providing rules based management suggestions for configuring and maintaining the storage server 102.

Handling Storage Transactions

Storage transactions are received over one of the connection options 130. Storage transactions include read and write requests as well as status inquiries. The requests may be block oriented.

A typical read storage transaction is comprised of the read command and addressing information. A write storage transaction is similar to the read storage transaction except the request includes information about the amount of data to be sent and is followed by the data to be written. More specifically, using the SCSI-3 protocol, each device has an identifier (ID). The machine issuing the request is called the initiator and the machine responding to the request is called the target. In this example, the server 100A is the initiator and has ID 7. In this example, the storage server 102 is the target and has ID 6. The SCSI-3 protocol provides for two or more addressing components, a logical unit number (LUN) and an address.

The LUN specifies a subcomponent of the target ID. For example, in a combined hard disk/tape drive enclosure, the two devices might share an ID, but have different LUNs. The third addressing component is the address where the device data is to be read from or stored to. The storage server 102A provides for virtual LUNs on a per initiator basis. Thus, a single storage server 102A might support, for example, ten thousand virtual LUNs or more.

The storage server 102A will map the SCSI-3 storage transaction request to a virtual circuit corresponding to a virtual LUN. A virtual circuit is a sequence of one or more virtual devices. A virtual device is composed of one or more devices such as software modules or hardware components.

For example, two network interface devices could be combined to be a virtual device. Similarly, two cache devices could be combined as a virtual device. This design permits components to fail without disrupting the storage transaction processing capabilities of the storage server 102.

A virtual circuit comprises the necessary virtual devices to support a storage transaction. Typically, the first component in the virtual circuit is a driver for translation of the storage transaction from the storage transaction communication channel format, FCP in this example, to an internal format. One such internal format may be similar to the intelligent input and output ($I_2O$) block storage architecture (BSA) message format. The internal format is storage medium and communication channel neutral in the preferred system.

The intermediate virtual devices of a virtual circuit provide additional services such as caching, mirroring, RAID, etc. Because the internal format is storage medium neutral, all of the intermediate virtual devices can be designed to operate on the internal format and thus interoperate with other virtual devices in the circuit.

The final virtual device in a virtual circuit is typically the format translation and communication channel drivers for controlling the storage. For example, the drive array 132 is controlled by redundant hardware driver modules (HDMs) that are grouped to form a virtual device. The HDMs provide BSA to SCSI translation and the HDM handles the interface to the drives that compose the drive array 132. Similarly, if the virtual circuit is a link to some other type of storage over the network interface 138, there will be a virtual device with support for BSA translation to the storage device communication channel protocol.

The storage server also includes resources in the operating system and at the interfaces to the client servers which emulate physical storage devices. The emulation allows the virtual devices to appear to the client servers accessing the storage as if they were physical devices. Thus, the client servers can be configured to communicate using standard protocols, such as FCP using SCSI commands for storage transactions. In the embodiment utilizing SCSI commands, the emulation involves responding to an inquiry command according to the SCSI protocol with device identifiers and device capability information expected by, or compatible with, the initiating server. Also, a read capacity command and a mode page data command in the SCSI protocol are handled by the emulation resources in a manner that allows the client servers using the storage to rely on standard configuration information for physical storage devices, while the storage server spoofs the client server by emulating the physical storage devices at the interface with the client server, and maps actual storage transactions to virtual devices. The emulation resources also allow the virtual devices to be identified by the combination of an initiator, a logical unit number (LUN), and a target device identifier, without requiring the storage transaction to be tied to the specific physical target device identified in the request.

Figure 5:
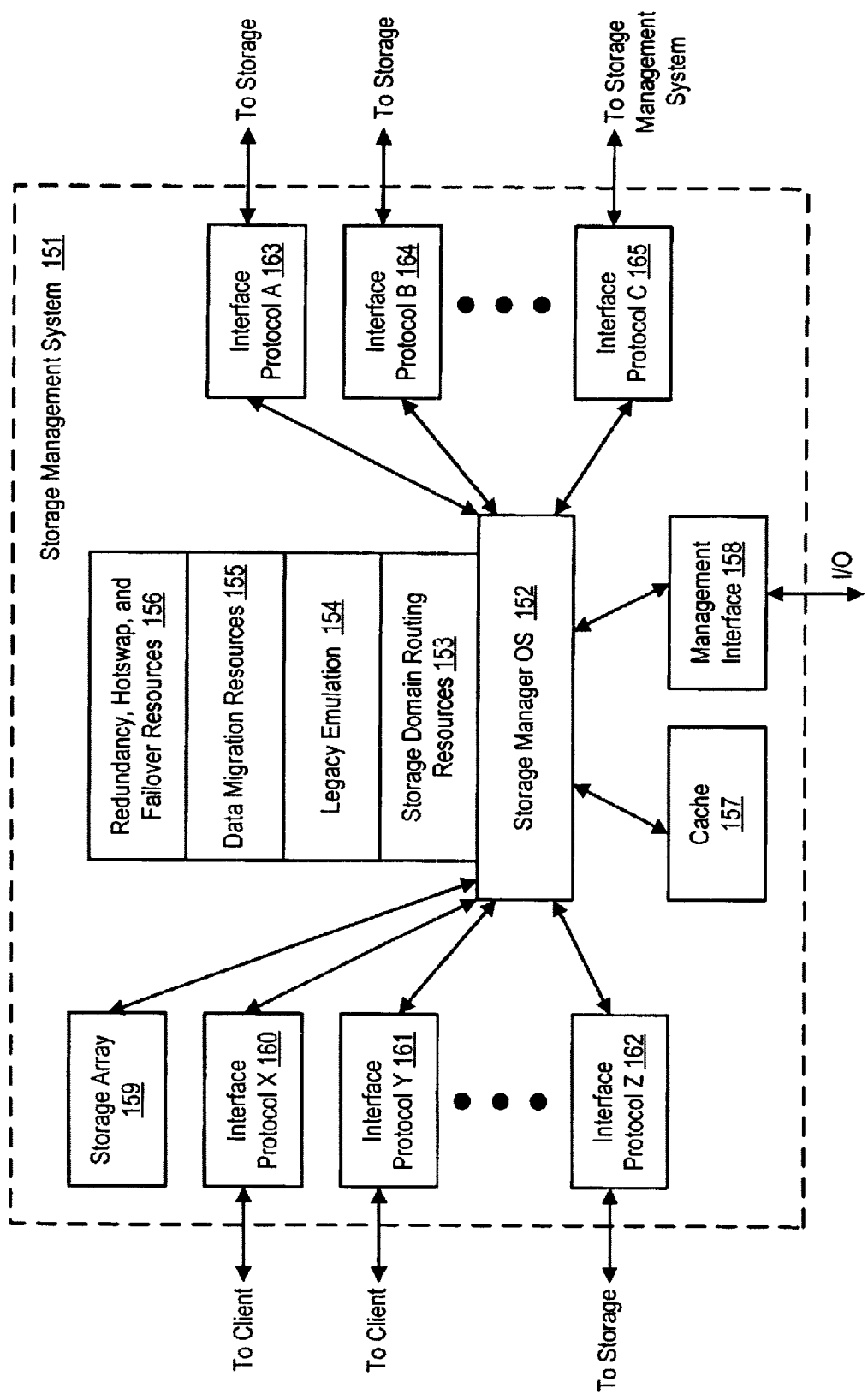
FIG. 5 is an alternative diagram of a storage server supporting storage domain management according to the present invention.

FIG. 5 is a block diagram showing functional components of a server, like that illustrated with respect to FIG. 4, acting as a storage management system 151 for use in storage domain management. The system 151 includes a storage manager operating system 152. With the storage manager operating system 152, functional components include storage domain routing resources 153, legacy device emulation resources 154, data migration resources 155, and redundancy, hot swap and failover resources 156. The storage manager operating system coordinates communication among these resources an on-chassis cache 157, a management interface 158, and in this embodiment an on-chassis storage array 159.

The cache 157 comprises a solid state non-volatile memory array in one embodiment of the invention, for safe support of storage transactions. In another embodiment, the cache 157 comprises redundant arrays, for additional fault tolerance.

A plurality of communication interfaces 160–165 are provided on the system 151. In this example, the interface 160 is adapted to execute protocol X between a client and the storage management system 151; interface 161 is adapted to execute protocol Y between a client and the storage management system 151; interface 162 is adapted to execute protocol Z between a storage device and the storage management system 151; interface 163 is adapted to execute protocol A between a storage device and the storage management system 151; interface 164 is adapted to execute protocol B between a storage device and storage management system 151; and interface 165 is adapted to execute protocol C between the storage manager system 151 and another storage management system on the network.

In the example illustrated, protocols X–Z and protocols A–C are supported by the storage management system 151. These protocols may be multiple different protocols, variants of a single protocol, or all the same as suits a particular storage area network in which the system is utilized.

Storage transactions traverse the interfaces 160–165 from respective communication media to the internal resources of storage management system 151. In a preferred system, storage transactions are translated to a common messaging format internal to the system for routing among the various interfaces, independently of the protocols executed by those interfaces. Storage domain routing resources 153 map the transactions within the storage domain using virtual circuits configured for particular client devices and storage devices. Legacy emulation resources 154 and data migration resources 155 allow a storage domain to be reconfigured at the storage management system 151 as new equipment is added and removed from the network. For example, a new storage device may be added to the network, and a data set in an existing storage device may be migrated to a new storage device, and storage transactions from clients using the data set may be made to appear as if they remain on the existing storage device during the migration, and after migration is completed by providing target emulation. The redundancy, hot swap, and failover resources 156 insure fault-tolerance, and support continuous operation of the storage management system 151 for high throughput data storage networks.

Hardware Architecture Overview

Figure 6:
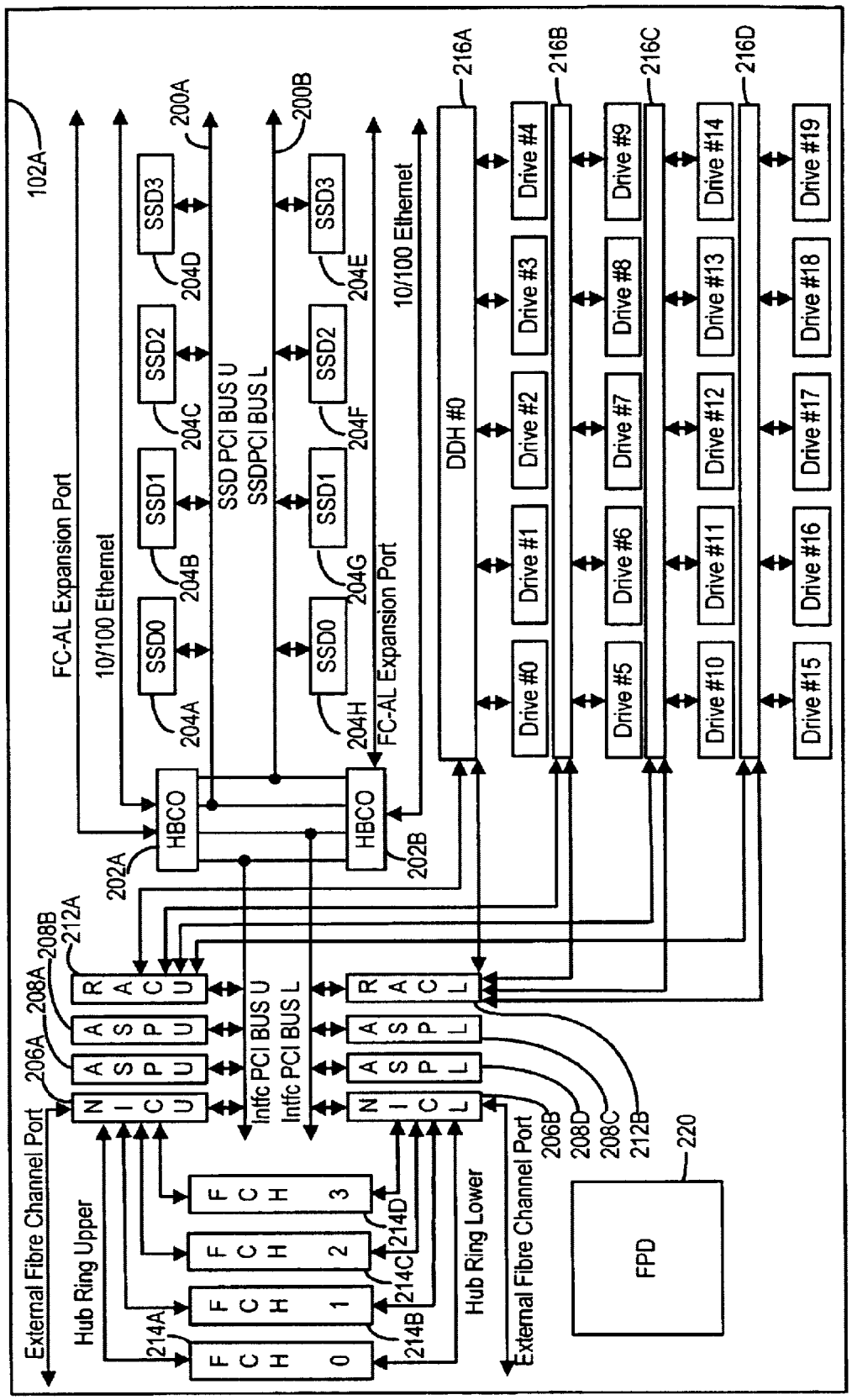
FIG. 6 is a block diagram of the hardware architecture of an intelligent storage area network server.

FIG. 6 is a block diagram of one suitable hardware architecture of an intelligent storage area network (storage) server. The hardware architecture implements redundancy and supports distributed software systems to prevent any one single point of failure from interfering with a particular storage transaction.

FIG. 6 includes the storage server 102A. The storage server is designed to provide a high degree of redundancy while using standard components and the standard based devices. For example, the storage server 102A uses a high speed version of the standard peripheral component interconnect (PCI) implementation and standard fibre channel arbitrated loop (FC-AL) interfaces. A variety of other protocols and interfaces can be used in other embodiments.

The storage server 102A has four separate 64-bit 66 MHz PCI busses 200A–D. Many different configurations of storage devices and network interfaces in the slots of the PCI busses are possible. In one embodiment, the PCI busses are divided into two groups: the SSD PCI busses 200A–B and the interface PCI busses 200C–D. Each group has two busses that are designated by the terms upper and lower. The upper and lower busses in each group can be configured to provide redundant services. For example, the lower SSD PCI bus 200B has the same configuration as the upper SSD PCI bus 200A.

The PCI busses 200A–D are connected to host bridge controller (HBC) modules 202A–B. The HBC modules 202A–B span the PCI busses 200A–D and provide redundant bridging paths.

The SSD PCI busses 200A–B support solid state drive (SSD) modules 204A–G. The SSD modules 204A–G provide solid state storage devices such as a flash memory store.

The interface PCI busses provide an interconnection from the network interface controller (NIC) modules 206A–B, the redundant arrays of independent disks (RAID) Controller (RAC) modules 212A–B, and application specific processing (ASP) modules 208A–D to the HBC modules 202A–B.

In addition to coupling the storage server 102A to the external FC-AL, the NICs 206A–B can be coupled to fibre channel hub (FCH) modules 214A–D. Each FCH module 214A–D is coupled to both NIC modules 206A–B. Each FCH module 214A–D provides ten FC-AL ports, and can be cascaded through the NIC modules 206A–B to provide a twenty station FC-AL hub.

The disk drive hub (DDH) modules 216A–D provide a redundant FC-AL fabric to connect disk drives to the RAC modules 212A–B. The FC-AL fabric in each of the DDH modules 216A–D comprises two redundant loops, which couple all of the drives attached to the DDH module with both RAC modules 212A–B. The RAC modules manage a loop among all of the DDH modules 216A–D. The DDH modules 216A–D each support five dual-ported disk drives such as the disk drive 218.

The system mid-plane (SMP) is not depicted in FIG. 6. The SMP is a passive mid-plane that provides the interconnections shown in FIG. 6 between the HBC module 202A–B, the SSD modules 204A–H, the RAC modules 212A–B, the NIC modules 206A–B, the FCH modules 214A–D, the DDH modules 216A–D, and the ASP modules 208A–D. The SMP is compact PCI based, with four custom compact PCI busses 200A–D, RAC-DDH interconnections, and NIC-FCH interconnections and miscellaneous control busses comprising the mid-plane signals. In addition, the SMP provides power distribution from the power subsystem, not depicted in FIG. 6, to the modules, at voltages of 48V, 12V, 5V, and 3.3V.

The front panel display (FPD) 220 provides a user interface for the storage server 102A. The FPD contains a display device and an input device. In one embodiment, a touch sensitive liquid crystal display (LCD) is used to present a touch sensitive screen with input capabilities. The FPD 220 is coupled to the HBC modules 202A–B to support status displays, configuration display and management, and other management functions.

Power and fan subsystems, not depicted in FIG. 6, provide redundant AC to DC power supplies, redundant DC to DC power conversion, battery backup for power down, and a redundant push-pull fan subsystem. These components support the high availability and low down time features that are important when a storage area network is deployed.

The storage server 102A can be coupled to other storage servers to appear as a single network port in a storage area network or as a network attached storage device. This coupling can be done over the FC-AL expansion ports that are coupled to each of the HBC modules 202A–B. Additionally, the HBC modules 202A–B offer RS232 serial ports and 10/100 Ethernet ports for out-of-band management.

The bus system includes all of the busses in the storage server 102A. In this example, the bus system includes the four PCI busses interconnected by the host bridge controllers. The bus system also includes the PCI busses internal to the HBC modules that provide additional interfaces. The slots include all of the positions on the bus system which can receive interfaces. In this example, each of the four PCI busses outside of the HBC modules can accommodate four interfaces.

The interfaces are the cards or other devices that are placed in the slots. The interfaces support drivers and hardware for the data stores coupled to the interfaces.

Redundancy and Fail-Over

The storage server 102A offers a high degree of redundancy. In one embodiment, there are redundant NIC, RAC, and HBC modules. The SSD modules and drives support mirroring. The drives also support parity and dual channel access. Each DDH module contains a fully redundant FC-AL fabric for connection to the RAC modules. Fail-over is handled by the HBC modules, which control the other modules in the storage server. The control is multi-layered.

The HBC module's first layer of control-over is the power supply control. Each module has an individual power supply enable signal that is controlled by the CMB controller on the module. Although the HBC modules are redundant, only one HBC module will serve as the master HBC module and direct and control the system. The other HBC will act as a slave. When a module is plugged into a slot, its power supply is initially disabled. Only the master HBC module can enable the power supply. If a module begins to perform improperly and does not respond to commands, the HBC module can disable the power supply to the module.

The second layer of control for the HBC modules is the card management bus (CMB). Each module has an Atmel AT90S8515 (AVR) microcontroller that is coupled to the CMB. The HBC module itself has an AVR microcontroller 316 coupled to the CMB that can act as a master or as a slave. The CMB microcontroller is powered by a connection to the midplane independently of power supplied to the main processor on the module. The CMB allows the master HBC to read a card type, determine if a card is present, send a non-maskable interrupt to a card or perform a hard reset of a card. Module processors and the master HBC module can also perform communication through a serial port on the AVR microcontroller on the module. This communication path can be used as a backup for control communication in the event of a PCI failure.

The third level of control for the HBC modules is the PCI bus. If a module does not respond using a control process on the PCI bus, it can be queried via the CMB. If the module still does not respond, a non-maskable interrupt can be set via the CMB. If the module still does not respond, it can be reset via the CMB. If after reset, the module still does not respond, it can be powered down and a warning can be issued to replace the module.

Software Architecture Overview

A storage server is supported by an operating system that is designed to support the uniquely high bandwidth, high throughput, and demands of a storage server. The operating system schedules and controls data transfers over the bus systems and manages the system. Although a number of different operating system and software component structures are possible, in one embodiment, a highly modular operating system designed for a storage server is used.

Figure 7:
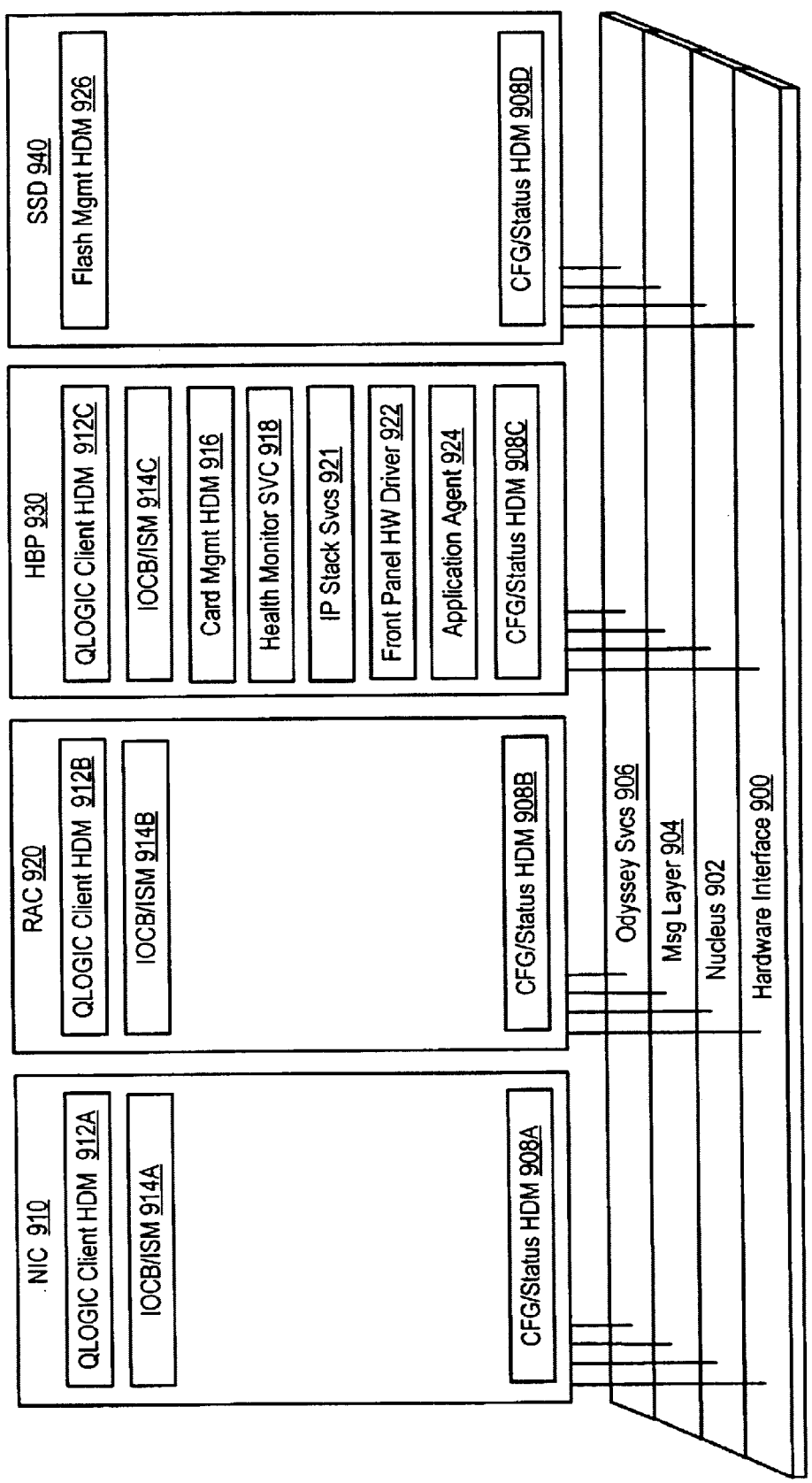
FIG. 7 is a block diagram of the software modules of an operating system and supporting programs for an intelligent storage area network server.

FIG. 7 is a block diagram of the software modules of an operating system and supporting programs for a storage server.

FIG. 7 includes the following operating system components: the hardware interface module 900, the Nucleus PLUS™ real-time kernel module 902 available from Accelerated Technologies, Inc., Mobile, Ala., the ISOS protocol management module 904, and the storage services module 906. The hardware interface module 900 allows the software components of the storage server to communicate with the hardware components of the storage server.

The Nucleus PLUS™ real-time kernel module 902 is used to provide basic operating system functions such as: tasks, queues, semaphores, timers, and critical section support. The Nucleus PLUS™ real-time kernel module 902 is exported to the software modules of the storage server as functions in C++ classes by the storage services module 906.

The ISOS module 904 permits the storage server to support a messaging architecture for input and output. The hardware modules such as the RAID controller (RAC) modules, the network interface controller (NIC) modules, the solid state drive (SSD) modules, the disk drive hub (DDH) modules, and the fibre channel hub (FCH) modules, are all input/output processors (IOPs). The master host bridge processor (HBC) module serves as the host.

The storage services module 906 implements messaging classes to support the reliable transport of messages between components. The storage services module 906 supports the operation of device driver modules and support for virtual devices. The device driver modules (DDMs) and virtual devices (VDs) are the building blocks of the storage server storage system. The storage services module 906 is organized around providing support for requests for storage transactions.

In some applications, a single storage server such as the storage server 102A will have several hundred DDMs operating in conjunction with the operating system modules 900–906 to support responses to storage server requests. Other applications use a few DDMs in various combinations.

Software components are implemented as device driver modules (DDMs). A DDM that primarily services requests for a hardware device is termed a hardware driver module (HDM). A DDM that serves as an internal, intermediate program is termed an intermediate service module (ISM). For example, the DDMs that service the SSD modules are termed HDMs. The DDMs that provide cache services, mirroring services, and other types of services not directly linked to a hardware device could be termed ISMs.

A single DDM can have multiple instantiations on a single storage server. For example, in FIG. 7, there are four instantiations of the performance, health and status PHS monitor 908A–D, one for each of the four major software subsystems: the NIC 910, the RAC 920, the HBC 930, and the SSD 940. Each DDM has its own message queue and a unique identifier. For example, the PHS monitor 908A on the NIC 910 might be device ID (DID) 0. Each DDM also lists the class of storage requests handled by the DDM and the operating system modules route the requests to the DDMs based on the class of the storage request. Requests can be routed by request codes or by virtual device numbers.

The NIC software subsystem 910 includes three DDMs: a processor support HDM 912A, an input/output translation ISM 914A and the PHS monitor 908A. The RAC software subsystem 920 includes three DDMs: a processor support HDM 912B, an input/output translation ISM 914B, and a PHS monitor 908B. The HBC software subsystem 930 includes: a processor support HDM 912C, an input/output translation ISM 914C, a card management HDM 916, a system monitor DDM 918, an Internet Protocol DDM 921, a front panel display DDM 922, an application specific processor support DDM 924, and a PHS monitor 908C. The SSD software subsystem 926 includes a solid state drive management HDM 926 and a PHS monitor 908D. The front panel display 950 supports a hypertext markup language (HTML) client 928.

Figure 8:
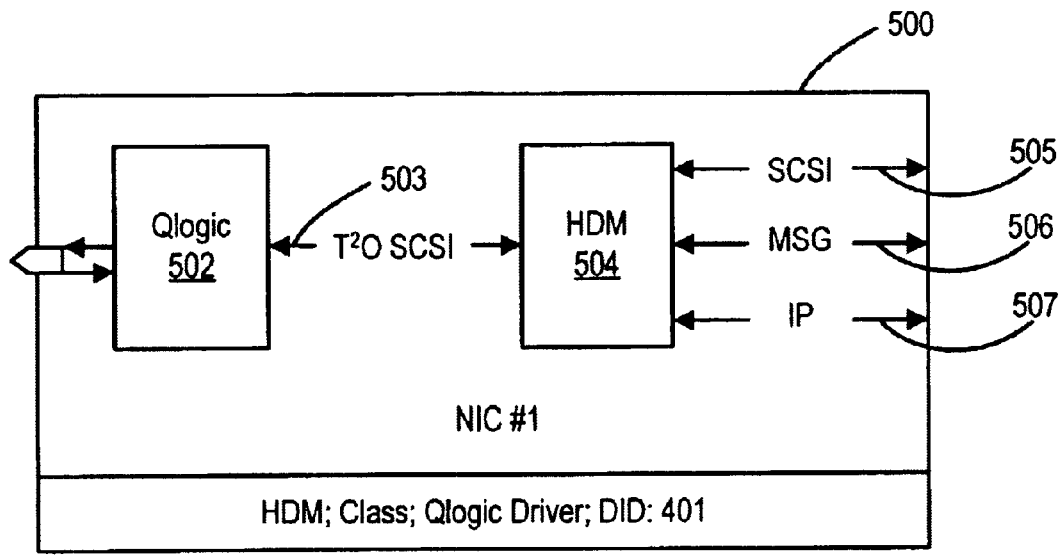
FIG. 8 is a simplified diagram of a hardware driver module for a fibre channel interface for use in the system of the present invention.
Figure 9:
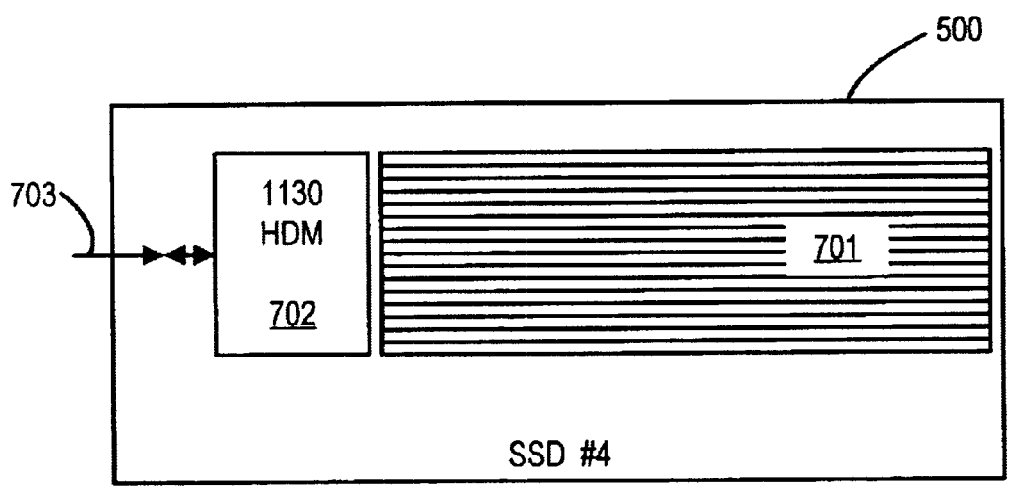
FIG. 9 is a simplified diagram of a solid state storage system including a hardware driver module of the present invention.
Figure 10:
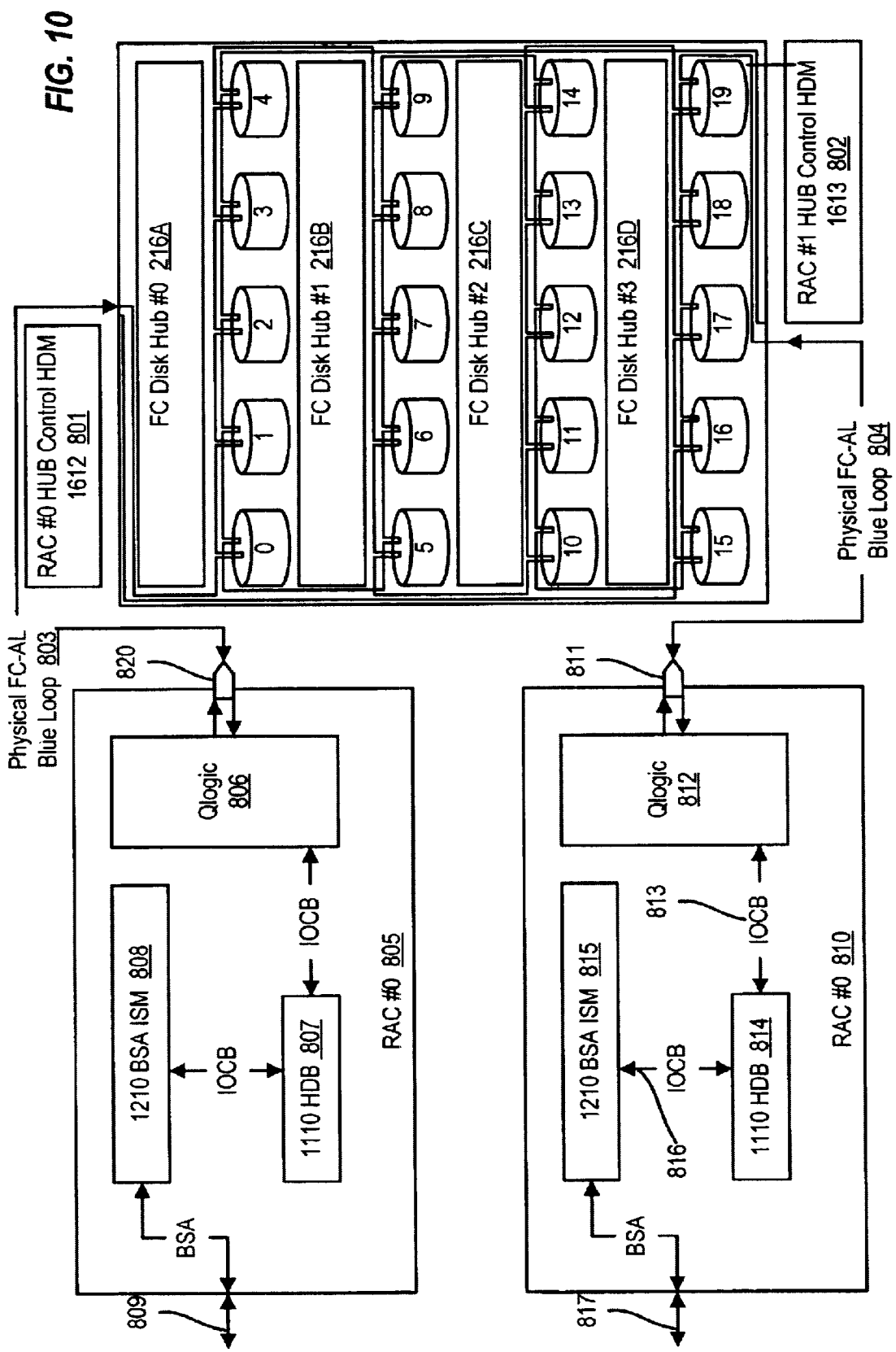
FIG. 10 is a diagram of an internal array of disk drives mounted in one embodiment of a storage server according to the present invention.

FIGS. 8–10 illustrate a variety of hardware driver modules (HDMs) and FIGS. 11–14 illustrate a variety of internal, intermediate service modules (ISMs) according to the preferred architecture of the present invention. FIG. 15 provides a simplified diagram of a set of driver modules which have been configured into data paths acting as virtual circuits.

FIG. 8 illustrates a network interface card 500 having an HDM 504. The card 500 has a physical interface 501 to a fibre channel network. A network interface chip 502, in this example a Qlogic device, such as an ISP 2200A provided by Qlogic Corporation of Costa Mesa, Calif., is coupled to the physical interface 501. The network interface chip 502 generates communication represented by line 503, which is processed in the HDM 504. The HDM 504 conditions the communications for use by other driver modules in the system. Thus, communication represented by line 505 has an SCSI format. Communication represented by line 506 has a message format such as a BSA format. Communication represented by line 507 has an Internet Protocol (IP) format. The HDM is an instance of a driver class labeled "QLogic driver" in the diagram, and given device identifier DID 401 in this example. The physical interface is identified as NIC #1.

FIG. 9 illustrates a storage device 700 which is implemented by an array of non-volatile integrated circuit memory devices. One embodiment of the device 700 is described in co-pending U.S. patent application Ser. No. 09/292,536, entitled High Speed Bus Interface for Non-Volatile Integrated Circuit Memory Supporting Continuous Transfer, filed Apr. 15, 1999, which is owned by the same assignee as the present application, and is incorporated by reference as if fully set forth herein. The HDM 702 is coupled with the array 701, and translates the block storage architecture communications on line 703 into format for storage and retrieval from the array 701. In this example, the HDM 702 is given a device identifier 1130. The physical interface is identified as SSD #4.

FIG. 10 illustrates the configuration of an array 800 of disk drives which are mounted on the storage server chassis in a fibre channel arbitrated loop architecture in the preferred embodiment shown in FIG. 6. Fibre channel disk hub #0 216A, channel disk hub #1 216B, fibre channel disk hub #2 216C, and fibre channel disk hub #3 216D, which are also illustrated in FIG. 6, are coupled to redundant hub control HDMs 801 and 802.

HDMs 801 and 802 are connected with physical fibre channel arbitrated loop connections 803 and 804, respectively. The HDM 801 is given device identifier 1612 and the HDM 802 is given device identifier 1613. The connection 803 is coupled to a fibre channel interface 805. Interface 805 includes a network interface chip 806 which is coupled with physical interface 820, and to an HDM 807. An ISM 808 is coupled to the HDM 807 and to the internal communication path 809. The ISM 808 translates the block storage architecture communications on line 809 into IOCB communications for the HDM 807. The HDM 807 communicates with the network interface chip 806, which in turn drives the fibre channel 803. The ISM 808 is given device identifier 1210, and the HDM 807 is given device identifier 1110. The physical interface 805 is labeled RAC #0.

The fibre channel connection 804 is coupled to interface 810. Interface 810 has a configuration like interface 805. Thus the interface 810 includes a physical fibre channel interface 811 which is driven by network interface chip 812. The network interface chip 812 communicates on the channel represented by line 813 with HDM 814. HDM 814 communicates with ISM 815 via channel 816. The ISM 815 manages an interface to the BSA format messages on channel 817. In this example, the ISM 815 is given device identifier 1211. The HDM 814 is given device identifier 1111. The interface 810 is identified as RAC #1.

FIGS. 8–10 illustrate a variety of physical communication interfaces and corresponding HDMs. FIGS. 11–14 illustrate a variety of ISM examples according to the present invention, which can be configured into data paths.

Figure 11:
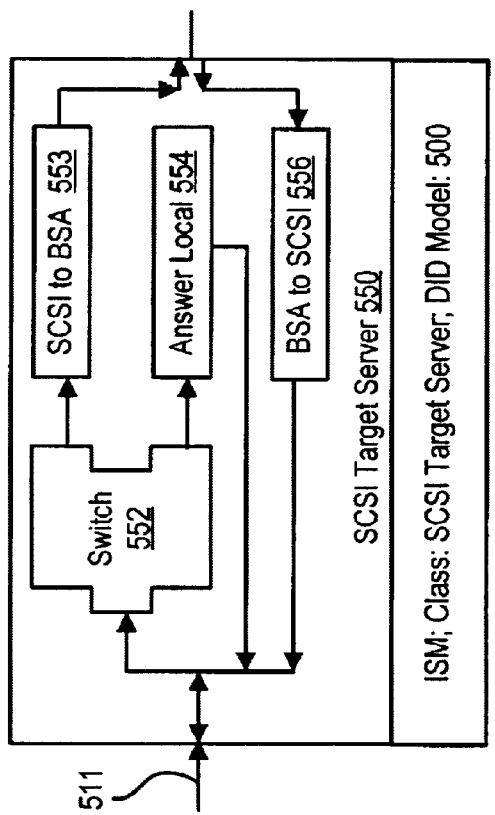
FIG. 11 is a simplified diagram of a target server internal service module according to the present invention, having a local answer capability.

FIG. 11 shows an SCSI target server 550, which is one example of a protocol server module according to the present invention. Similar protocol server modules can be implemented for any particular storage channel or network protocol implemented by users of the data managed through the storage server of the present invention. The target server 550 has a message interface 551 which receives incoming messages from an HDM, such as the HDM of FIG. 8, coupled to a communication interface adapted for connection with a user. In this example, the messages on interface 551 have an SCSI format. In other examples, the messages may already have the BSA architecture, or some other architecture which is suitable for the protocol on the communication interface being served. The server 550 includes a switch function 550 which translates incoming messages to an SCSI to BSA translator 553, or to an answer local function 554. Typically, messages are forwarded by the translator 553 as outgoing messages on line 555. Incoming messages on line 555 are supplied to translator 556 which translates the incoming BSA messages to the SCSI format used on line 551.

In many instances, the SCSI target device can respond using the local answer service 554 to the SCSI message without routing the message further. Many status messages that do not relate to reading or writing from the storage itself are handled by the local answer service 554.

The target server 550 in this example is an instance of a class SCSI target server, and given a device identifier 500. One function of the protocol server, such as the SCSI target server 550, is to identify the storage extent which is subject of a storage transaction on the associated interface. The storage extent is mapped to a virtual circuit using the configurable logic in the storage server as described in more detail below.

Figure 12:
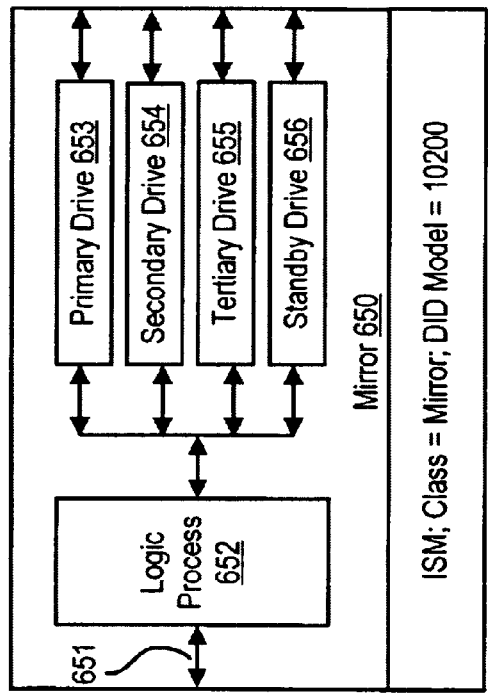
FIG. 12 is a diagram of an internal service module implementing a disk mirror.

FIG. 12 illustrates an ISM 650 which performs a mirror management data path task. The ISM 650 includes an interface 651 which is connected to the internal communication channels on the device. Logic processes 652 receive the incoming communications and data and manage a mirroring function. The logic 652 communicates with a plurality of drive interfaces including primary drive 653, secondary drive 654, tertiary drive 655, and standby drive 656. Although 3-way mirroring is shown in the diagram, any number of mirror paths may be implemented for "n-way" mirrors using virtual circuits. Although the drive interfaces in FIG. 12 are labeled with the term "drive," other types of storage devices can be used in the mirroring functions. The drive interfaces 653–656 communicate using the internal communication channels with the HDM modules associated with the target storage devices used in the mirroring function, or with other ISM modules as suits the particular virtual circuit. In this example, the mirror ISM 650 is implemented as an instance of a class "mirror," and given a device identifier 10200.

Figure 13:
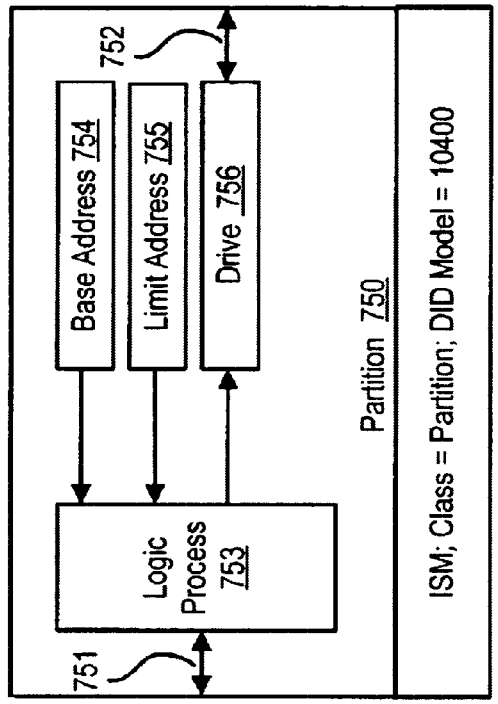
FIG. 13 is a diagram of an internal service module implementing a partition function.

FIG. 13 illustrates a partition ISM 750. The partition ISM 750 includes an interface 751 which receives internal communications from other driver modules, and an interface 752 which also communicates with other driver modules. The ISM 750 includes logic processes 753, data structures for storing a base address 754 and a limit address 755, and a drive interface 756. The partition logic process 753 configures the subject storage device identified by the drive process 756, using a logical partitioning function useful for a variety of storage management techniques, so that the physical device appears as more than one logical device in the virtual circuits. In this example, the partition ISM 750 is an instance of a class "partition," and given device identifier 10400.

Figure 14:
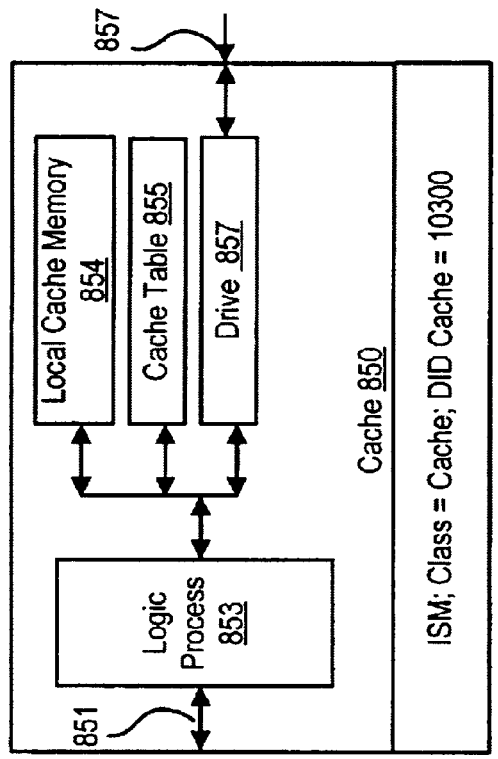
FIG. 14 is a diagram of an internal service module implementing a cache function.
Figure 15:
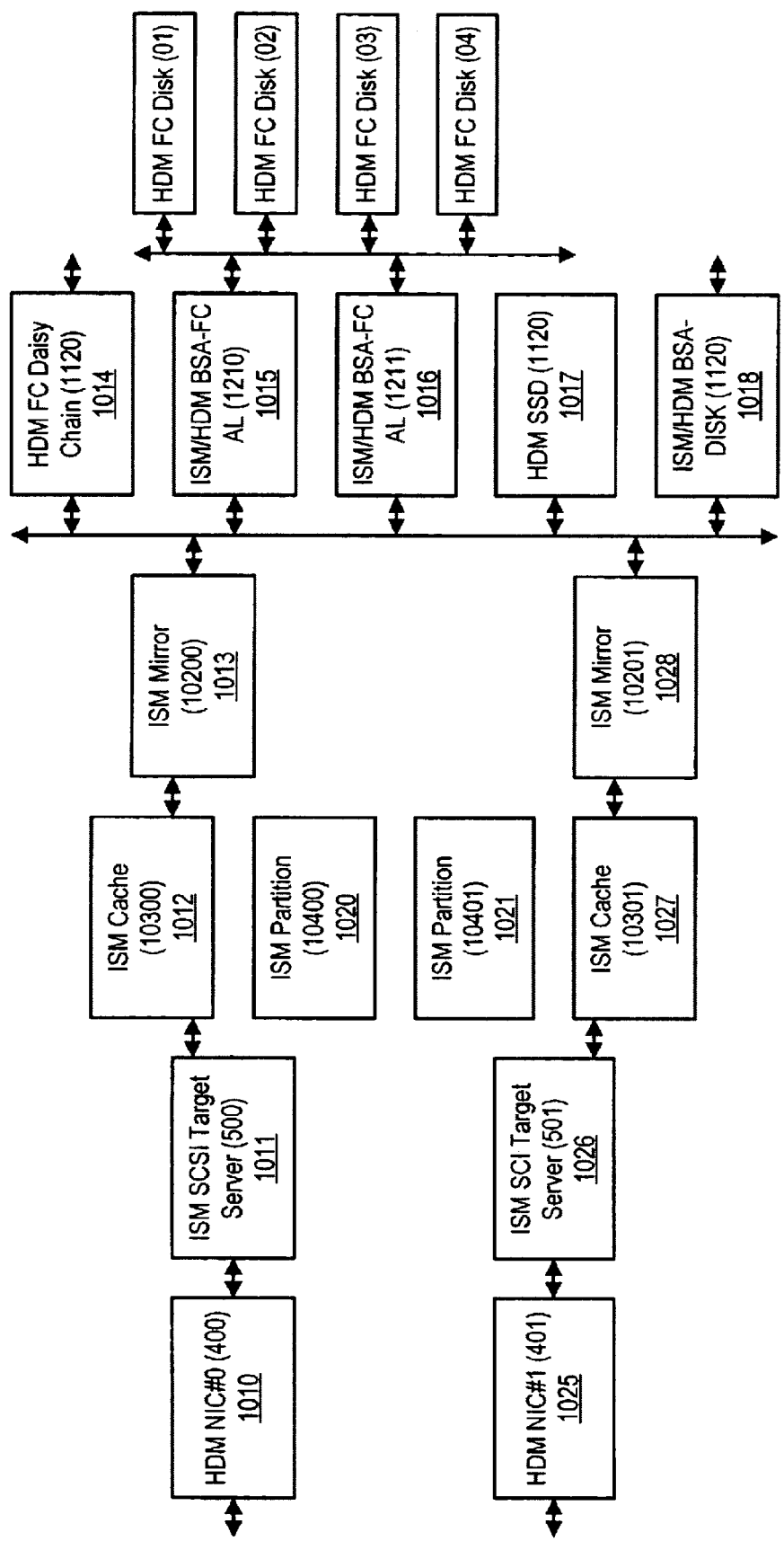
FIG. 15 illustrates a virtual circuit configuration according to the present invention.

FIG. 14 illustrates a cache ISM 850. The cache ISM 850 includes logic processes 853 which communicate with an interface 851 to the internal message passing structure on the storage server. Data structures in the cache ISM 850 include a local cache memory allocation 854, a cache table 855 which identifies the data stored in the cache 854, and a drive interface 856. The drive interface communicates on channel 857 with an HDM associated with the particular virtual circuit being served by the cache. The cache memory 854 in one embodiment is managed locally in the storage server. In an alternative embodiment, the cache can be stored in a high-speed, non-volatile memory, such as a solid state memory module having architecture Like that described with respect to FIG. 9. In the preferred embodiment, the cache ISM 850 is implemented as an instance of a class "cache," and given a device identifier 10300.

FIG. 15 provides a heuristic diagram of redundant virtual circuits implemented by data paths including a plurality of driver modules according to the present invention. Virtual circuits include an external interface for communication with a user of the data, a protocol translator for translating communications with the user into the communication format of the driver modules, and a storage object which includes a communication interface to a storage device. Storage operators which perform data path tasks can exist between the translator and the storage object. The optimal ordering of the driver modules acting as storage operators, such as cache, mirror, partition, etc., is done by the system designer using the configurable logic provided by the storage server.

In the example illustrated in FIG. 15, the external interface is provided by the NIC #0, and its associated HDM is represented by block 1010. The protocol translator is provided by the SCSI target server ISM 1011. A cache function is provided by the ISM 1012. A mirror function is provided by the ISM 1013. The storage objects are accessed from the mirror function 1013, and consist of a set of physical storage interfaces selected in this example from the fibre channel basic daisy chain interface and its associated HDM represented by block 1014 or an external LUN interface, the disk drives in the fibre channel arbitrated loop accessed through the ISM/HDM pair represented by block 1015 and the redundant block 1016, the solid state storage device and its associated HDM represented by block 1017, and the interface to an external disk drive and its associated ISM/HDM pair represented by block 1018. Separate HDM modules on the fibre channels interface to disks (01), (02), (03), and (04) manage the communication across the fibre channel arbitrated loops with the interfaces 1015 and 1016.

In the embodiment shown, the mirror module 1013 accesses disks (01), (02), and (04) as the primary, secondary and standby drives, respectively, for the mirror functions. Although the mirror module shown in FIG. 12 includes the tertiary drive interface, this tertiary drive is not used in the example system.

Also shown in the diagram are partition ISM modules 1020 and 1021, which are not connected with the data paths of the virtual circuit shown. These blocks are present to illustrate that using the virtual circuit structure, new modules, like partitioning, may be added to the path by simply configuring the storage server.

A redundant data path is implemented using the interface NIC #1 and its associated HDM represented by block 1025, the SCSI target server ISM represented by block 1026, the cache ISM represented by block 1027, and the mirror ISM represented by block 1028. Redundancy in the data storage devices is accomplished using the mirror function. The redundant driver modules are distributed in a preferred embodiment on separate IOPs within the storage server.

As illustrated in FIG. 15, each of the driver modules includes a unique driver identifier which is shown within the parentheses in the blocks of FIG. 15. The unique device identifiers are used to support the configuration logic based on tables in a configuration database managed by the storage server, and controlled by local configurable logic in the storage server.

Figure 16:
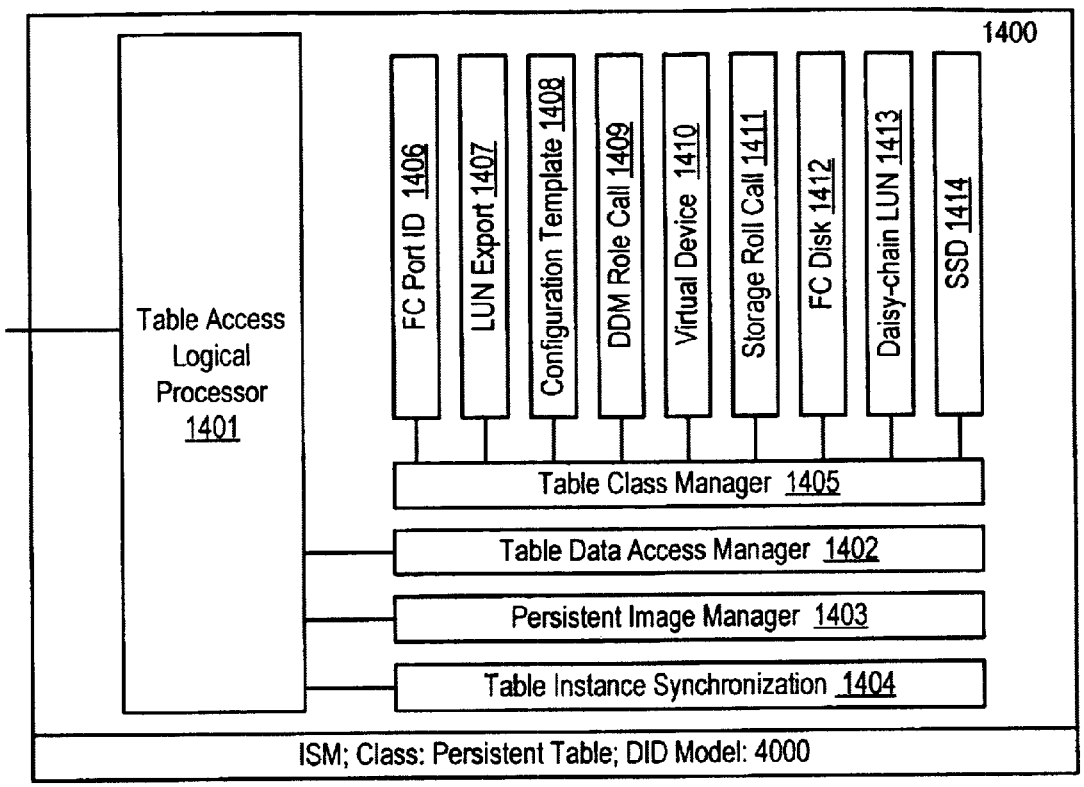
FIG. 16 is a diagram of an internal service module implementing a persistent table store manager according to the present invention.
Figure 17:
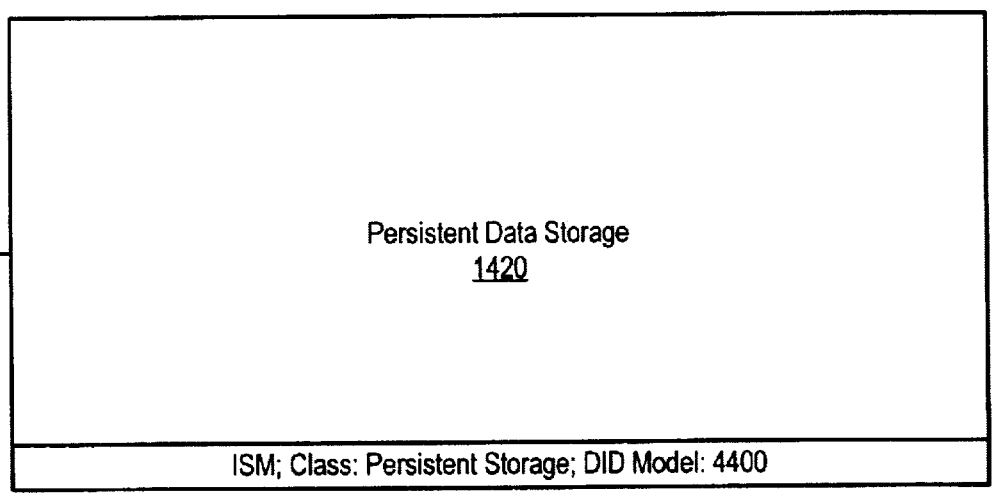
FIG. 17 illustrates schematically a persistent storage hardware driver module according to the present invention.

In the preferred system, the configuration tables are managed by a persistent table driver, such as that illustrated in FIGS. 16 and 17. Referring back to FIG. 4, the storage server 102 stores management and routing information in tables such as the tables 116. The tables 116 can be accessed through the management interface 120. The tables 116 will typically be stored in persistent memory such as a non-volatile memory. The tables 116 can be maintained redundantly to provide failsafe support.

FIG. 16 illustrates a persistent table module 1400 which is implemented as an instance of a class "persistent table," following the basic architecture of the driver module structure. The persistent table module 1400 includes a table access logical processor 1401, and a variety of supporting functions including table data access manager 1402, persistent image manager 1403, and persistent table instance synchronization module 1404. The table data access manager 1402 is coupled with a table class manager 1405 in this embodiment. The table class manager manages a plurality of configuration tables including a fibre channel port ID table 1406, a LUN export table 1407, a configuration template table 1408, a DDM roll call table 1409, a virtual device table 1410, a storage roll call table 1411, a fibre channel disk roll call table 1412, an external LUN table 1413 and a solid state storage table 1414. The particular configuration of the set of tables managed by the persistent table module 1400 can be changed to suit the particular implementation, and optimized for certain classes of devices.

The persistent image manager 1403 and the table instance synchronization manager 1404 communicate with persistent data storage driver 1420 as illustrated in FIG. 17, and a second persistent storage driver not shown. The persistent data storage driver 1420 is implemented as an HDM, which is an instance of a class "persistent storage," and is given a device identifier following the model of the driver modules described above. In the preferred system, the persistent data storage HDM 1420 communicates with the solid state storage device in the storage server, and provides fast access to the data used in the virtual circuits.

The persistent data storage maintains a wide variety configuration information for the system. The DDM roll call table 1409 includes a list of all the instances of the device driver modules, and their unique device IDs. The storage roll call table 1411 includes a list of all the active storage devices detected by the storage server. The roll call tables can be utilized by the virtual device table 1410 and by the configuration tools to create virtual circuits. The LUN export table 1407 provides a technique for mapping the identified storage extents within a storage channel transaction to virtual circuits. The external LUN table 1413 identifies logical units of storage which are maintained in other storage servers connected through the external storage interface on the storage server.

Two primary tables support the exporting of storage to clients and the storage routing functionality of the storage server 102A. These tables are the export table 1407 and the virtual device configuration table 1410.

The Export Table 1407

The export table 1407 maps addressing information received with a storage transaction to a virtual circuit or to a storage option. In the case of SCSI-3 over a fibre channel interface, the addressing information used is the initiator ID, the target LUN, and the target address.

It is not necessary to use all of this information to resolve each request because many LUNs can be shared across all initiators, or clients, and most LUNs will use the target address, e.g., the offset on the storage device, for addressing within the virtual circuit rather than for selecting different virtual circuits. Thus in a typical embodiment, the export table 1407 is organized as shown in Table 1.

TABLE 1

| Protocol | Protocol Specific Addressing (LUN) | Initiator Specific? if yes, ID | First virtual device in circuit | Primary connection owner |
|---|---|---|---|---|
| SCSI | 0 | No | 11 | NIC 0 |
| SCSI | 1 | Yes, ID=6 | 30 | NIC 0 |
| SCSI | 1 | Yes, ID=5 | 60 | NIC 1 |
| SCSI | 2 | No | 12 | NIC 0 |
| TCP/IP | Port 2000 | No | 70 | NIC 0 |

The export table 1407 may include other columns such as the current state of the virtual circuit, the capacity of the virtual circuit, and other information. In one embodiment, the export table 1407 lists the entire virtual circuit in a column of the export table.

Table 1 shows that protocol specific addressing information can be used to route the request to the appropriate virtual circuit. Therefore, only TCP sessions using port 2000 as the identifier of the target extent of storage would be routed to the virtual circuit starting with the virtual device having identifier 70.

Table 1 shows that a single LUN for a protocol can be connected to different devices depending on the initiator of the storage transaction. In this example, LUN I is mapped to different virtual circuits based on the initiator ID. Also, virtual circuits can be mapped based on other types of identifiers, such as the World Wide Name (WWN).

An example export table has the following structure:

```
#define EXPORT_TABLE "Export_Table"
struct ExportTable Entry {
      rowID           ridThisRow;           // rowID of this table row.
      U32             version;              // Version of Export Table record.
      U32             size;                 // Size of Export Table record
                                            in bytes.
      CTProtocolType  ProtocolType;         // FCP, IP, other
      U32             CircuitNumber;        // LUN or other
      VDN             vdNext;               // First Virtual Device number in the
                                            Path
      VDN             vdLegacyBsa;          // Virtual Device number of the
                                            legacy BSA
      VDN             vdLegacyScsi;         // Virtual Device number of the
                                            legacy SCSI
      U32             ExportedLUN;          // LUN number exported
      U32             InitiatorId;          // Host ID
      U32             TargetId              // our ID
      U32             FCInstance;           // FC Loop number
      String32        SerialNumber;         // Use a string array for Ser. No.
      long long       Capacity;             // Capacity of this Virtual Circuit
      U32             FailState;
      U32             PrimaryFCTargetOwner;
      U32             SecondaryFCTargetOwner;
      CTReadyState    ReadyState;           // Current state
      CTReadyState    DesiredReadyState;    // Desired Ready State
      String16        WWNName;              // World wide Name (64 or 128-bit
                                            IEEE registered)
      String32        Name;                 // Virtual Circuit Name
#endif
```

The Virtual Device Configuration Table

The virtual device configuration table connects virtual devices with the device drivers that support the virtual device. The virtual devices are designed to support a redundant design. Therefore, the table for virtual device configurations maps virtual device numbers to device modules. In one embodiment, a table such as Table 2 is used to map virtual devices to supporting device drivers. FIG. 15 illustrates the virtual circuit implemented by Table 2, starting with virtual device 12.

TABLE 2

| Virtual Device | Primary | Alternates | Parameters | Status | Class |
|---|---|---|---|---|---|
| 1 | 4000 | 4001 | N/A | Primary | Persistent Table |
| 10 | 1210 | 1211 | SO(00) | Alternate | FC Disk |
| 11 | 500 | 501 | VD(10) | Primary | SCSI Target |
| 12 | 500 | 501 | VD(13) | Primary | SCSI Target |
| 13 | 10300 | 10301 | VD(14) | Primary | Cache |
| 14 | 10200 | 10201 | VD(15, 16, null, 17) | Primary | Mirror |
| 15 | 1210 | 1211 | SO(02) | Primary | FC Disk |
| 16 | 1210 | 1211 | SO(03) | Primary | FC Disk |
| 17 | 1210 | 1211 | SO(04) | Primary | FC Disk |

As Table 2 shows, for each virtual device, information is provided about primary and alternate driver modules supporting the virtual device. For example, in the second entry in Table 2, a fibre channel disk drive is mapped to virtual device (VD) 10.

The virtual device comprises the one or more software or hardware modules for supporting the virtual device. The parameters column is used to provide initialization information. In the case of VD 10, the parameter is SO(00) which stands for storage option 0. Each device driver module class has class specific parameters. Storage option drivers use parameters specifying a particular storage unit. Intermediate driver classes such as the mirror driver and the cache driver use parameters that specify the next virtual devices in the virtual circuit. This format allows a single device driver module to support multiple devices based on the parameter setting. Notice that in Table 2, the device driver 1210 is being used by virtual devices 10, 15, 16, and 17, but each specifies a different parameter to the driver.

The status column indicates the status of the software or hardware modules supporting the virtual device. For example, in the first entry in Table 2, the status is "primary", which means that the primary device driver, 4000 here, is being used. In the second entry in Table 2, the status is "alternate", which means that the primary device driver has failed or is not responding properly. In that case, the alternate driver, 1211 for the second entry in Table 2, is used. If a device has more than one alternate, the status column will indicate the driver being used.

EXAMPLE

For example, consider a storage transaction that comes over one of the connection options 130 to the storage server 102A using the SCSI protocol and designating LUN 2 in the addressing information. Assume that the storage server 102A is configured as shown in Tables 1 and 2 for this example.

The connection option such as the network interface 146 over which the storage transaction is received is coupled to a hardware device driver. The hardware device driver receives the storage transaction and depending on the protocol, dispatches it to an appropriate virtual device for handling that protocol.

For example, SCSI storage transactions are sent to a device driver in the SCSI target class. Similarly, IP storage transactions are sent to a device driver in the IP target class. Here, the storage transaction was made using the SCSI communication protocol so it is routed to a SCSI target device driver (DID 500).

The SCSI target device driver further analyzes the request. The first part of the analysis is to determine which virtual circuit to map the request to. This determination can be made using the information in the export table. In this example, Table 1, indicates that a request using the SCSI protocol specifying LUN 2 should be routed to the virtual circuit starting with the virtual device 12. In one embodiment, all of the SCSI target requests are routed to the same SCSI target driver for a single interface. In this embodiment, the parameter information for the target VD 12 is used to control the behavior of the SCSI target device rather than routing the message to a second virtual device for a SCSI target.

The SCSI target device here, driver number 500, translates the SCSI message into an internal format. One such format is based on the I$_2$O block storage architecture (BSA) format. This format is device and protocol neutral and can be used by the intermediate device drivers. Once the request is in internal format, it is sent to the next virtual device in the virtual circuit as indicated by the parameter field, here, the parameter is VD(13) or virtual device 13.

The message is routed to the VD 13, which provides redundant caching drivers, here, the drivers numbered 10300 and 10301. The caching driver uses a memory to cache storage transactions. Based on the caching algorithm being used by the driver, the driver will route storage transactions to the next virtual device in the virtual circuit at appropriate intervals. Here that next device is indicated by the parameter VD(14), or virtual device 14.

In the internal format, the message is routed to VD 14. The virtual device 14 includes redundant mirroring drivers. In this case, the drivers 10200 and 10201 are used. The mirroring drivers implement a mirroring algorithm for maintaining a mirrored image of storage on multiple volumes. This mirroring driver supports a primary, secondary and tertiary store as well as a standby store. Other mirroring drivers may support different algorithms. This mirroring driver also supports the coupling of a new store that is steadily brought into synchronicity with an existing store. Based on the mirroring algorithm being used by the driver and the status of the mirrored stores, the driver will route storage transactions to the appropriate virtual devices in the virtual circuit. Assuming that both the primary and alternate stores are functioning, the mirror driver will route this request to the primary and secondary stores only according to the parameter VD(15, 16, null, 17) or virtual devices 15 and 16. The null in the parameter list indicates that no tertiary drive is currently being used for this virtual device.

The mirroring driver may route the storage transaction messages in serial or in parallel to the two devices. In this example, the messaging to virtual device 15 will be considered although the example can also be extended to the second store, virtual device 16. Virtual device 15 includes redundant drivers for controlling a fibre channel drive. The drivers translate the internal format into a format used by the drives, e.g., BSA to SCSI. The drivers also provide the addressing information to the drive. Here, the parameter SO(02) is used to select a storage option, here the fibre channel drive number 2.

Accordingly, within the storage platform, hardware functions (such as disk or flash storage) and software functions (such as RAID stripes or Mirrors) are all accessed via software drivers most commonly referred to as devices.

These devices are paired up (with each member of the pair preferably running a separate board for redundancy) and called Virtual Devices. These Virtual Devices are then chained together into various configurations. For instance, a mirror device can be chained to two or three disk devices. Through this type of configuration Virtual Device chains are constructed. These Virtual Device chains can be added to as long as they are being configured into some BSA-type device that can itself be used within yet another configuration.

Virtual Device chains are connected to a FCP/SCSI Target Server device and mapped in the FCP Target Driver's LUN export tables for "export" (i.e., to be accessible via the FCP protocol from the outside world). At that point the Virtual Device chain with a SCSI Target Server Device at its head is called a Virtual Circuit.

The Virtual Circuit Manager software responsible for creating Virtual Circuits puts the SCSI Target Server "head" onto a Virtual Device chain and then exports the Virtual Circuit by updating the FCP Target's Export Tables. The software also supports delete, quiesce and fail-over operations.

Virtual Circuit Manager software is also responsible for maintaining the Virtual Circuit Tables VCTs that list in a single place all the Virtual Devices in each Virtual Circuit. This information is needed to implement many system actions such as failover, hot-swap and shutdown.

When it is initialized, the Virtual Circuit Manager software defines the VCT itself in the persistent table store. The Virtual Circuit Manager software also listens for insertions, deletions and any modifications to the VCT.

In order to create a new Virtual Circuit, the information necessary to instantiate a SCSI Target Server and to map and export the new LUN must be placed into a record in the VCT. The Virtual Circuit Manager listens for insertions into the VCT and upon receiving a listen reply will perform the following actions:

1. Attempt to validate the information in the newly inserted record. If the record contains invalid information, its status field is set to indicate the error and no further action is taken.
2. Create a new SCSI Target Server device for the LUN of the Virtual Circuit specified by the newly inserted record.
3. Set the status in the new record to "Instantiated".
4. The storage assigned to the Virtual Circuit will be flagged as used in a Storage Roll Call Table.
5. The Export Table will be updated to dispatch the LUN to the new SCSI Target Server.

When a record in the Virtual Circuit is deleted, the Virtual Circuit Manager will perform the following actions:

1. Quiesce the Virtual Circuit if it isn't already and mark it as Quiesced.
2. Remove the Virtual Circuit's dispatch data from the Export Table.
3. Mark the Roll Call Record referenced from the Virtual Circuit Record as unused.
4. DeInstantiate the SCSI Target server associated with the Virtual Circuit.

The Virtual Circuit Manager also listens for modifications to the "Exported" field in the VCT. If the "Exported" field in any record in the VCT is set to True, then the Virtual Circuit Manager will perform the following actions:

1. Export the virtual circuit by making the necessary modifications to the FCP Target's Export Table.

2. If there is any error encountered during the Export Operation, the status field in the VC Record will be set and the "Exported" field will be left in a correct state.

If the Virtual Circuit was not exported, the Exported Flag will be set to False.

The Virtual Circuit Manager listens for modifications to the "Quiesced" field in the Virtual Circuit Table. If the "Quiesced" field in any record in the VCT is set to True, then the Virtual Circuit Manager will perform the following actions:

1. If the VC is currently exported, it will be unexported and its "Exported" flag will be set to False.
2. All of the Virtual Devices in the Virtual Circuit will be sent Quiesce Messages.
3. If there is any error encountered during the Quiesce Operation, the status field in the VC record will be set and the "Quiesced" field will be left in a correct state, i.e., if the Virtual Circuit was not quiesced, the Quiesced Flag will be set to False.

User Interface

Figure 18:
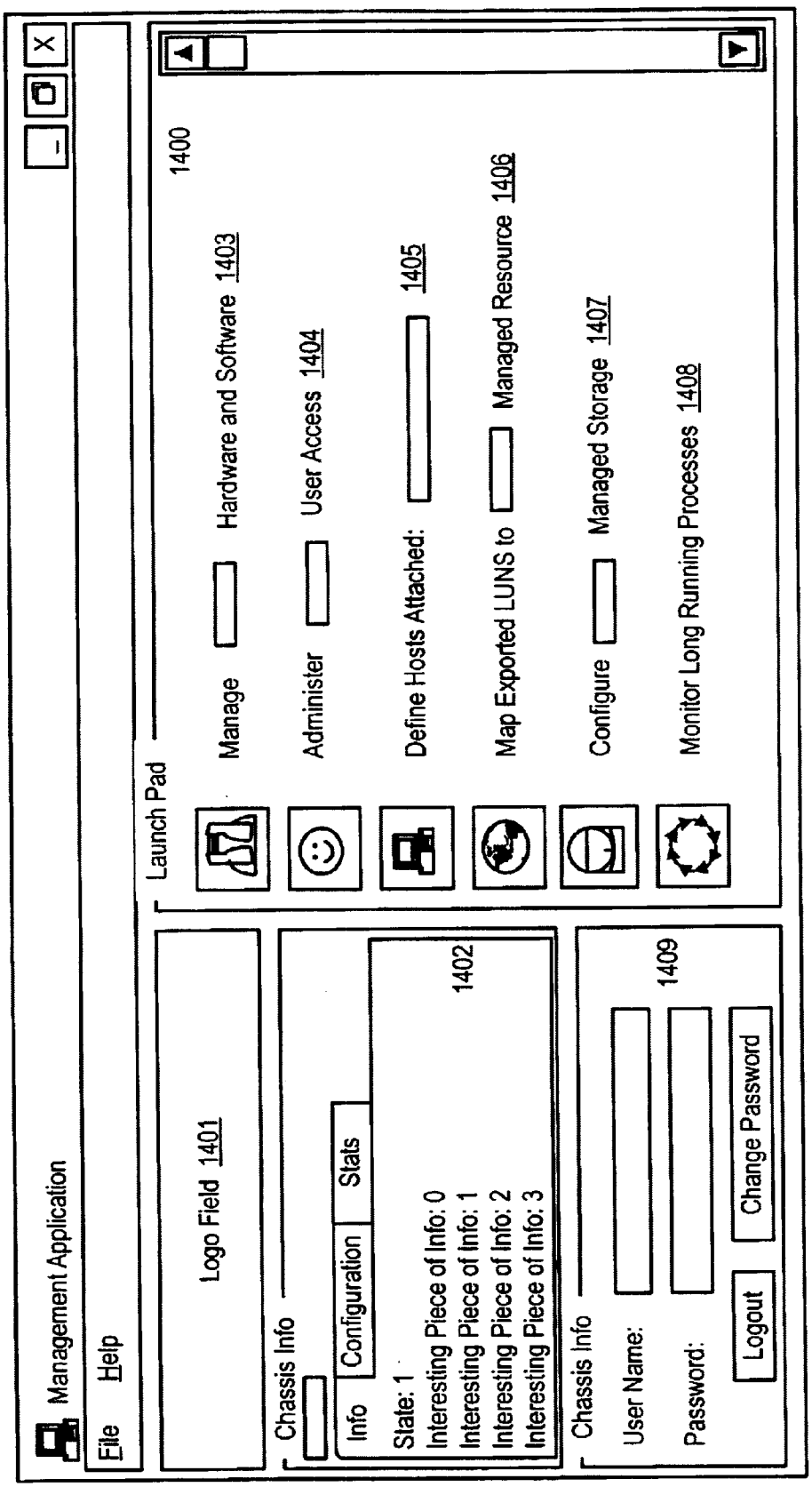
FIG. 18 illustrates an example opening image for a graphical user interface according to the present invention.

FIG. 18 illustrates an image produced by data processing structures for use in configuring a storage server according to the present invention. The image includes a window 1400 having a field 1401 for displaying a logo, a field 1402 for displaying basic information concerning the chassis of the server, and a set of icons 1403–1408, which when a selected, launch management applications. Routines provided for managing hardware and software are launched by button 1403, routines for administering user access are launched by button 1404, and routines to monitor long-running processes in the server are launched by button 1408. According to the present invention, a function for defining hosts attached to the server is launched by button 1405, a function for mapping exported LUNs to managed resources is launched by button 1406, and a function for configuring managed storage is launched by button 1407.

The window 1400 also includes a user logon dialog box 1409, including a field for entering a user name, and a field for entering a password.

Host Manager

The user launches a host manager using button 1405. This section describes a Java based user interface (UI) for defining hosts (servers) to storage server. The management software opens a window, such as the window 1450 shown in FIG. 19, that presents a table 1451 with entries that contain a host name in column 1452, a port number in column 1453, an initiator ID in column 1454 and a description in column 1455 for each host available for configuration and use. Other fields include a network interface card identifier in column 1456, and a unique host identifier in column 1457. The unique host identifier in a preferred example is the World Wide Number value for a fibre channel host.

The Host Manager is sub-component of the storage server's Java based management application that enables the user to assign a name and a description to a NIC port and initiator ID to facilitate the process of defining a LUN. General functionality is available through mouse pop-up, tool bar button and action menus to access an existing host or define a new host, using for example an add new host button 1458, a change host button 1459, or a delete host button 1460.

Figure 20:
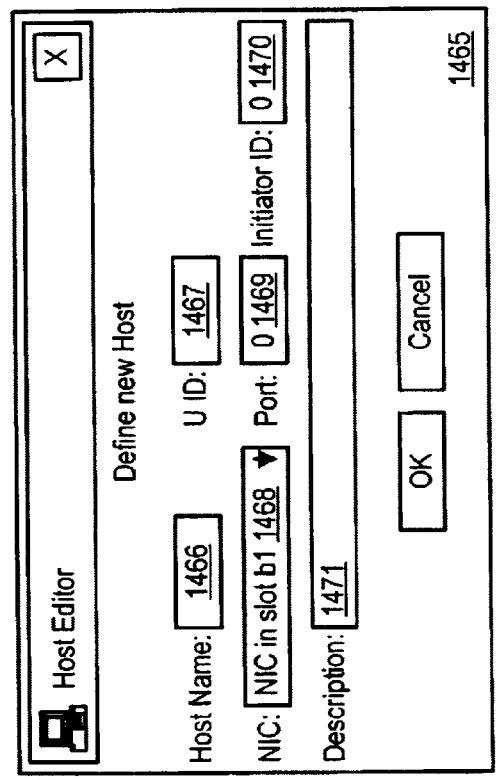
FIG. 20 illustrates a dialog box used for adding a host which is opened using the image of FIG. 19.

FIG. 20 illustrates a dialog box 1465 used in response to the add new host button 1458 of FIG. 19. The dialog box 1465 includes a field 1466 for inserting a host name, and a field 1467 for inserting a unique identifier of the host. Also fields are provided for inserting information about the network interface card 1458, a port number 1459, and an initiator ID 1470. Finally, a description field 1471 is included.

Figure 21:
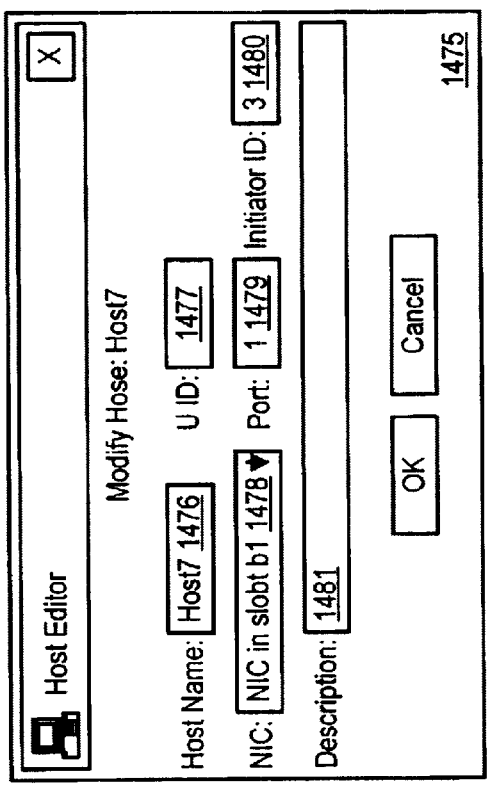
FIG. 21 illustrates a dialog box used for modifying a host which is opened using the image of FIG. 19.

FIG. 21 illustrates a dialog box 1475 used for modifying a host. It includes the fields 1476 for changing a host name, 1477 for changing a host unique identifier, 1478 for changing the network interface card identifier, 1479 for changing a port number, and 1484 for changing an initiator ID associated with the host. Also, a field 1481 is included for inserting or changing description text.

Hosts can be sorted for example by host name, NIC, port, initiator ID and description.

The User Interface consists of menus and a table, or other graphic construct, for displaying the host information. When the user enters the host manager panel, the table is populated with all the existing hosts. The user may select a row in the table. Each row contains information about one host. The user may then choose to modify or delete the host. If modify is chosen, a dialog box will appear allowing the user to change the host name and/or the description. The user will then hit the OK or Cancel button. If OK is hit, the changes will appear in the table and be sent to the server. If delete is chosen, a dialog box will appear with a label indicating the host to be deleted and buttons for OK and Cancel. If OK is hit, the host row will be deleted from the table and the deletion will be made at the server. If Add is chosen, a dialog box will appear that enables the user to add all information about a host. If OK is hit, a new row will be added to the table for that new host and a add will be done at the server. Clicking the column label will sort the columns.

Storage Mapping

Figure 22:
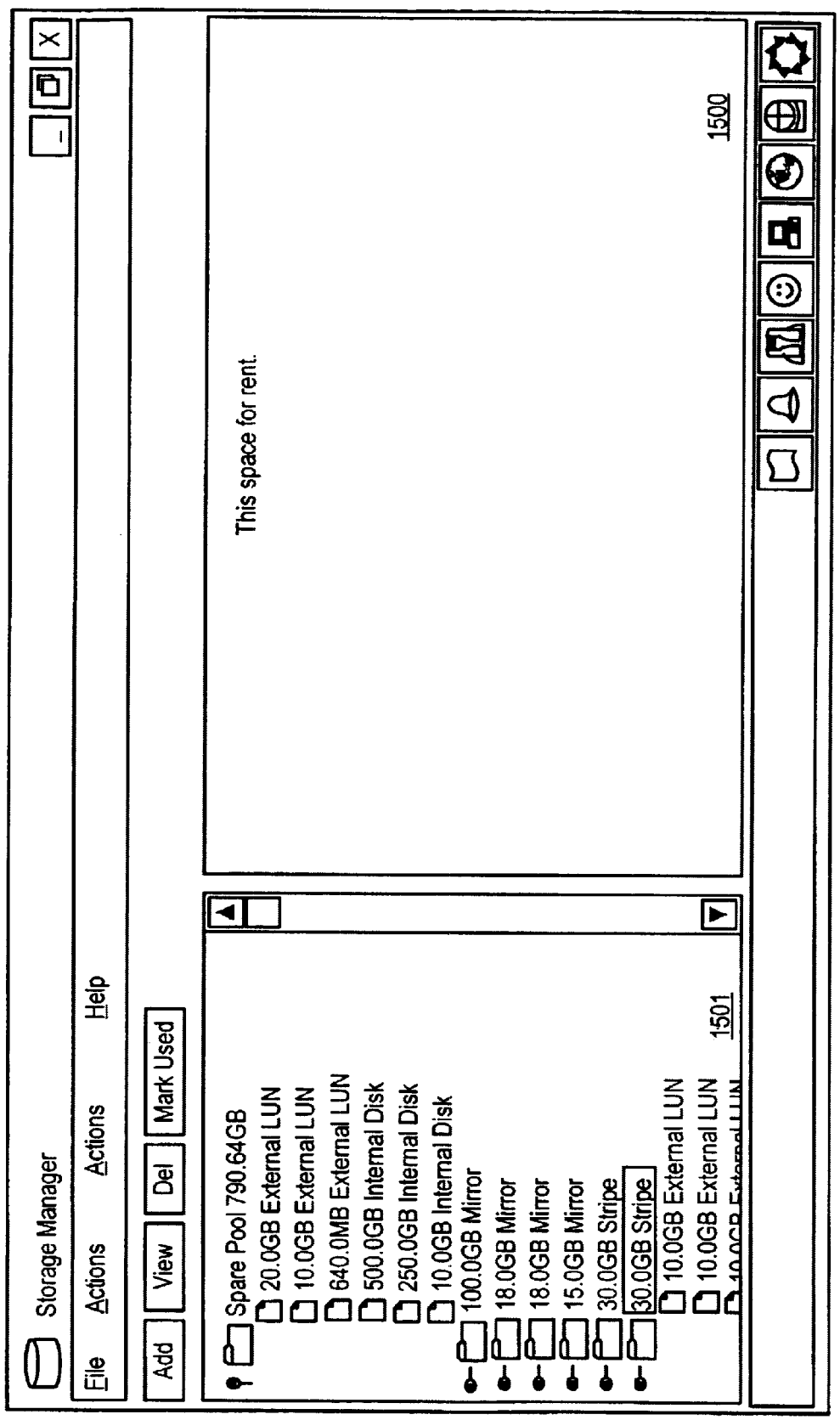
FIG. 22 illustrates an image used for prompting a user to add or revise storage elements available for use in a server according to the present invention.

Using button 1407 of FIG. 18, the user launches a storage manager routine which displays an image such as that shown in FIG. 22. The image of FIG. 22 includes a window 1500 that includes a hierarchical tree display construct 1501 for displaying storage elements.

Storage elements are defined using a tree structure (e.g. mirror to stripes to disks). This allows the user to build up their storage in a organized manner consistent with the way they think about storage.

Representative types of storage element include the following:

Mirror
Stripe
External LUN
Internal Disk
SSD
Storage Collection
Storage Partition By building these elements up in a tree (using for example a Microsoft Explorer-like tree display) the user will be able to pre-configure storage for use in Virtual Circuits. Each element can be partitioned up and these partitions can be used in different ways. For example, a stripe set can be partitioned up, with one partition being exported as one LUN and the other being used as one member in a mirror (which could then be partitioned itself).

If a storage element has been partitioned, the partitions will be kept in a Storage Collection, which will be the child of the partitioned element. For elements that are not partitioned, this partition collection will not be there. Each partition will be identified by what type of storage it is partitioning—a mirror partition, a disk partition, etc. The partitions of a given storage element can not be merged into a single partition unless all partitions of that element are available (i.e., the entire storage element is unused). To do this, the user will select a partitioned storage element that has only unused partitions, and hit the "unpartition" button.

If there are dedicated spares, these will also be kept in a Storage Collection which will be the child of the element to which those spares are dedicated.

So each storage element can potentially have as children: a partition collection, a spare collection and the actual storage elements that comprise the parent element.

The Storage Manager is, in some sense, a view into a Storage Rollcall Table which lists all connected storage on a server. Each available storage element will be seen as the head of a storage tree. For example, a mirror will be shown as available, but the stripes and disks that make up the branches of that mirror are not available, since they belong to the mirror. For them to be reused somewhere else they would need to be removed from that mirror (and therefore from the storage tree that descends from that mirror). In one embodiment, this will be done via drag and drop, in a manner like that by which files are moved from one directory to another in the Windows NT file explorer program.

The tree of all storage (used and unused) is shown on the left half of the display in this example, with each storage element having an icon representing what type it is and some identifying name or ID.

Beneath the tree, on the right side of the window or in another convenient location, the list of available (unused) storage is shown. This is a list of all storage that is not in use by another storage element, or a virtual circuit. It is expected that most storage that is not being explicitly used will be put in the general spare pool. This available (not in use) storage list is expected to be mostly used as a convenience to let the user easily find unused storage elements from which to build new storage trees. For example, if a solid state storage device (SSD) partition is being mirrored by a stripe set (RAID 0), the partition and stripe set will both be visible in the available list until they are put into the mirror. Once the mirror is created from the two members, it will be seen in the available list until it is incorporated into a virtual circuit.

On the right will be the information and parameters associated with whichever of the elements in the tree the user selects by clicking on it with the mouse. When a storage element that is visible in the available list is selected, it will be selected in both the available list and the storage tree.

Add and Delete functions are provided to create or remove entries, as well as a Modify function so that using tools provided by the user interface, the user can change things like "owner" or "last serviced" or "description", etc. fields for storage elements in the tree. The user will specify what it is that they are adding (mirror, stripe, disk, etc.), and an appropriate set of controls will be given them.

For an internal disk and external LUN, the user will specify things like name, size, maybe manufacturer. Specifying an internal disk is somewhat of a special case, since a disk is a piece of hardware and would therefore be detected automatically. The only time the user would add a disk is if they are just putting a placeholder in for some hardware that they will be attaching later. This may also be done for SSD boards.

For RAID arrays, what will happen is that the user will specify that they want to create an array of a given RAID level (mirror or stripe initially) and will then be able to specify the storage elements that will be members of that array. This specification will probably be done by selecting entries in a list of available storage elements, and the array capacity will be determined by the capacity of its members. The storage elements that are used as members of the array will then be tagged as unavailable (since they're part of the array) and the array itself will be added to the list of available storage. Each RAID array can also have dedicated spares assigned to that array in case one of the members fails.

Storage elements can also be partitioned—this will be done by selecting the element to be partitioned and specifying what size chunk the user wants. If the element was previously unpartitioned, this will result in two partitions being created—the partition the user asked for and another partition which is the rest (unused portion) of the storage. Additional partitions will come out of the unused portion as they are created.

The details display for each storage element will show as much information as we have available. One of the things shown in a preferred system is what a particular storage element's partitions look like (size and position).

LUN Mapping

Using the button 1406 of FIG. 18, a LUN map routine is instituted which presents the image shown in FIG. 23. The LUN (Logical Unit Number) map is essentially a list 1550 of LUNs and their associated data. These will be displayed as a list of names and descriptions. The VC (Virtual Circuit) that is associated with any given LUN is shown on this display. It is made visible when the user selects an entry from the LUN map and requests details.

The LUN map will show the existing list of LUNs by name, description, or other fields. Fields include:

Name 1551

Description 1555

Exported Status 1552

Host 1553

Storage Element(s) 1554

The LUN map allows:

Sorting based on various fields.

Filtering based on fields. This is only needed if more than one LUN is operated on at a time (for example, enable/disable).

Selecting a LUN for deletion or editing/viewing.

Defining and adding a new LUN.

Importing existing LUNs. (done via "Learn Mode" on hardware startup)

Adding a member and starting a Hot Copy Mirror process on a LUN.

Exporting, unexporting a LUN—this will basically start and stop the flow of data from the host.

Virtual Circuits are defined (to the user) as a storage tree or other graphic construct connected to a host, such as the dialog box 1600 shown in FIG. 24, which is launched using a button 1556 of FIG. 23. The dialog box 1600 includes a field 1601 for entry of a LUN name, a field 1602 for entry of a description, and field 1603 for entry of a target ID, and a field 1604 for entry of information about an exported LUN. Pop-up menus are launched using a host button 1605 for a list of available host, and a storage button 1606 for a list of available storage elements. A cache selection button 1607 is implemented as a check box.

Figure 26:
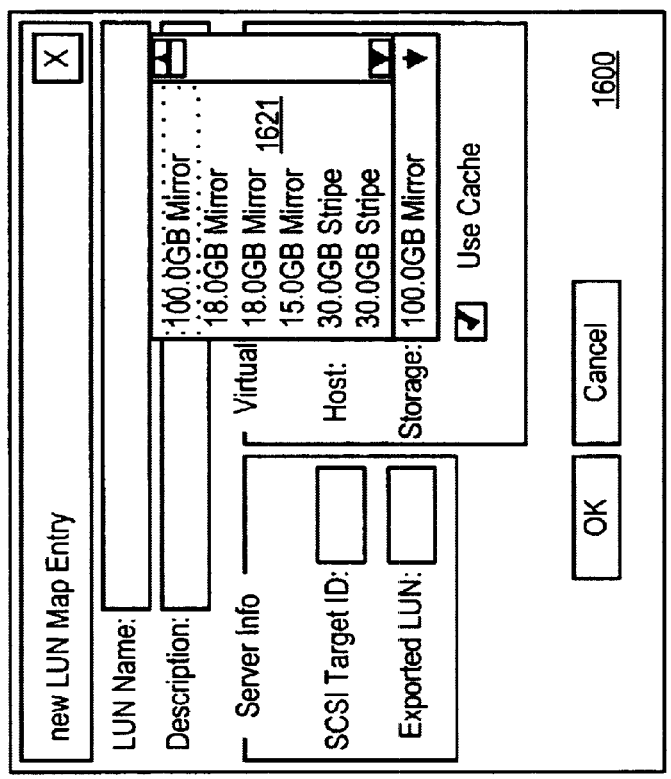
FIG. 26 illustrates a pop-up menu which is opened using the image of FIG. 24 for selecting a storage element to be included in a virtual circuit.
Figure 25:
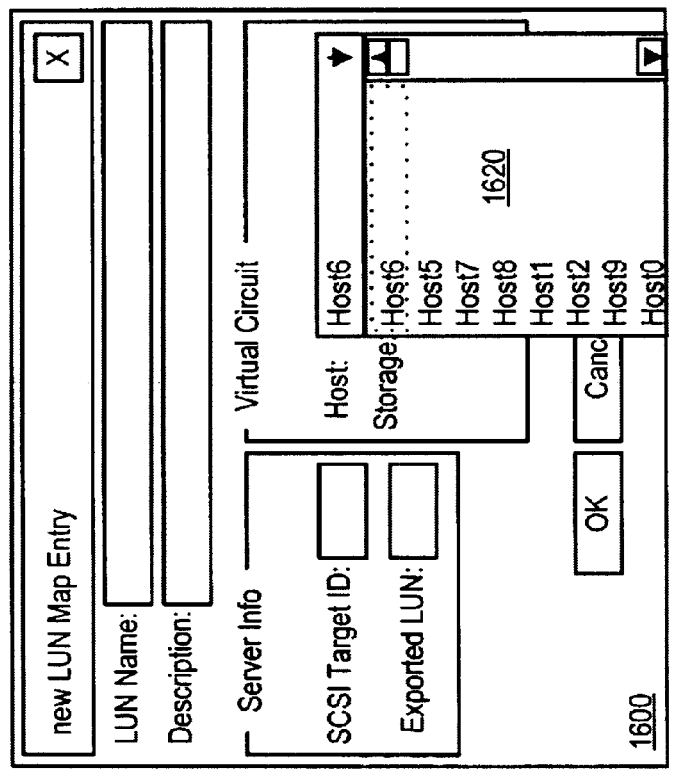
FIG. 25 illustrates a pop-up menu which is opened using the image of FIG. 24 for selecting a host to be included in a virtual circuit.

FIG. 25 illustrates the dialog box 1600 of FIG. 24 in which a host list 1620 is popped up by which the user is prompted to select a particular host for a virtual circuit. FIG. 26 illustrates the dialog box 1600 of FIG. 24, with a list 1621 which is popped up in response to selection of a storage button 1606 for a virtual circuit.

The storage tree is actually a tree of storage elements (e.g., a mirror which is comprised of some number of stripe sets, which in turn are comprised of some number of disks). The host is actually a server with a particular initiator ID, connected to a specific port on a NIC. This will be defined by the user via their selection of a pre-defined host and a pre-defined storage tree that represents some amount of available storage.

The use of cache is restricted to "on" or "off," using the check box 1607 of FIG. 24. Alternative systems provide tools for specification of cache size or cache algorithm. The cache use can be turned on or off on the fly without interrupting the flow of data along the virtual circuit. The default when a LUN is created will be "on".

One embodiment of the LUN Map will have the functionality necessary for creating virtual circuits. This will consist of a multi-column table with two columns; one for Host and one for Storage. The creation of a LUN will automatically export it, and functions available include "Add", "Modify" and "Delete".

The LUN Map display of FIG. 23 is a place that Hot Copy Mirrors are defined using a button 1557, since this would usually be done to an existing LUN. The process will be one of selecting the LUN, then selecting the storage tree to add to the existing storage tree via the addition of a mirror or the extension of an existing mirror (e.g. two-way to three-way).

Data Migration Support

Figure 27:
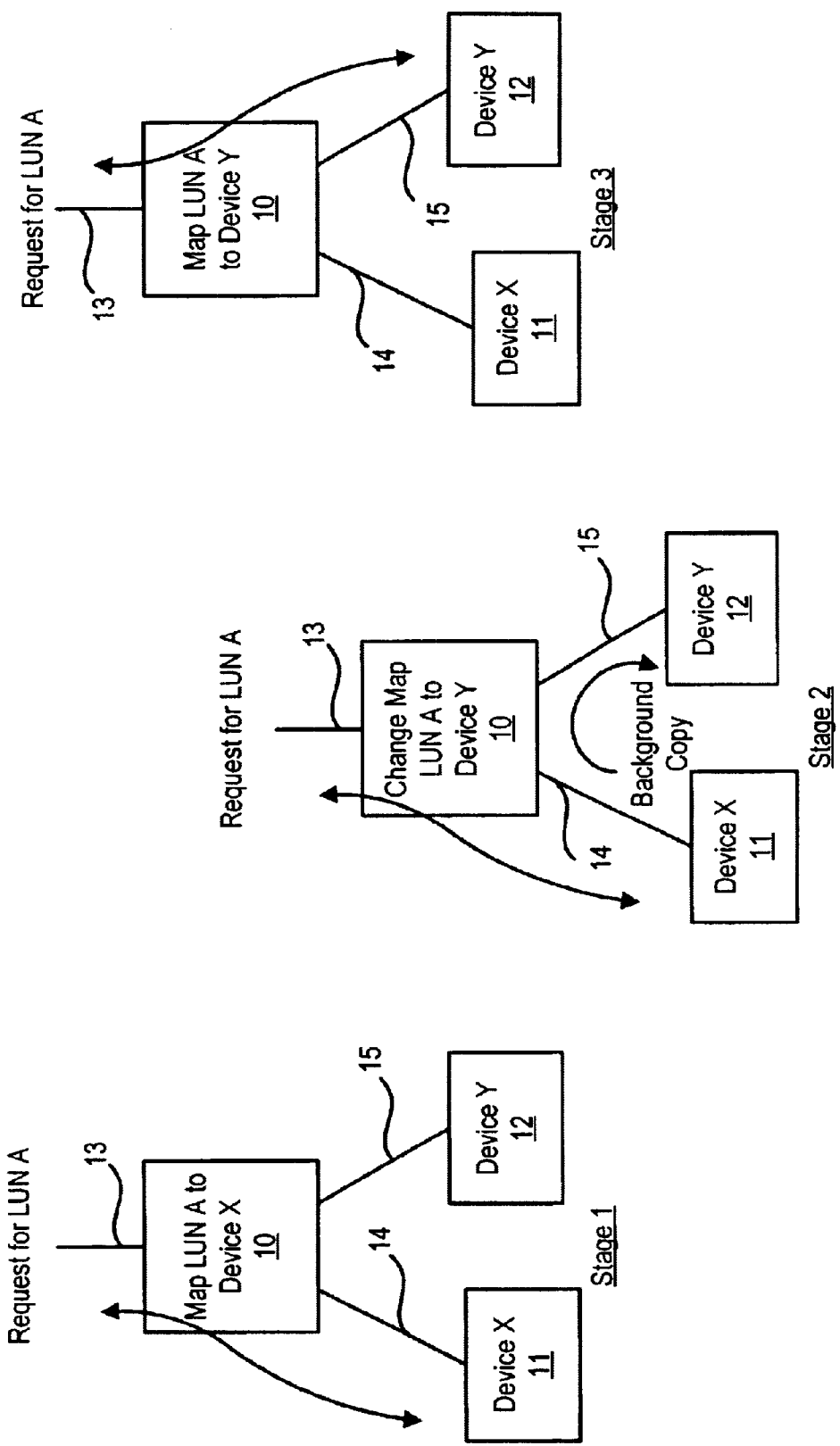
FIG. 27 is a simplified diagram of a network having an intermediate device with hot copy resources in three stages, according to the present invention.

FIG. 27 is a simplified diagram showing three stages of data flow in a storage network having a storage server 10 coupled to the first storage device 11 across communication link 14, and a second storage device 12 across communication link 15. The intermediate device 10 is also coupled to a client processor via communication link 13, by which it receives a request for access to data at logical address LUN A.

The storage server 10 includes memory, such as a non-volatile cache memory, for use as buffers, data transfer resources for transferring data access requests received on link 13 to the storage devices accessible across links 14 and 15. Also the storage server includes a logic engine to manage hot copy processes according to the present invention. This process can be understood by considering the three stages shown in FIG. 27.

In Stage 1, the storage server 10 maps all data access requests identifying the data set subject of the transfer and received on interface to link 13, to the link 14 for connection to the device 11, which stores the data set subject of the request. The storage server receives a control signal initiating a hot copy process and identifying a target device, in this example the device 12. This step initiates Stage 2, during which the data set is transferred as a background process from the first device 11 through the storage server 10, into the second device 12. Parameters are maintained on the storage server 10 indicating the progress of the transfer of the data set, and indicating a relative priority of the background hot copy process with respect to the data access requests from the client processor. During the hot copy process, data access requests are mapped to the first device 11 and the second device 12 depending on the progress of the hot copy, and on the type of request. Also, the storage server includes resources for assigning a priority to the hot copy process. If the priority of the hot copy process is low, then the client processor does not experience significant delay in fulfillment of its data access requests. If the priority of the hot copy processes relatively high, then the client processor may experience some delay in fulfillment of its data access requests, but the hot copy process will complete more quickly.

Upon completion of the transfer of the data set, Stage 3 is reached. In Stage 3, the data access requests from the client processor addressed to the data set are routed to the second device 12 across communication link 15. The storage device 11 may be removed from the network altogether, or utilized for other purposes.

The storage server 10, in the preferred embodiment comprises a storage domain manager as described above.

The storage devices 11 and 12 are illustrated in FIG. 27 as independent devices. However, the storage devices may comprise logical partitions within a single storage unit. In this case, the hot copy process results in migration of the data from one address within the storage unit to another address.

FIGS. 28, 29, 30 and 31 illustrate various aspects of a software implementation of a hot copy process for execution in the intelligent network server described above. In other storage servers used for a hot copy process, variations in the implementation will be made to accommodate the particular system. More details of components of a virtual circuit, persistent table storage, and user interface structures are described with reference to FIG. 9, and the following figures.

Figure 28:
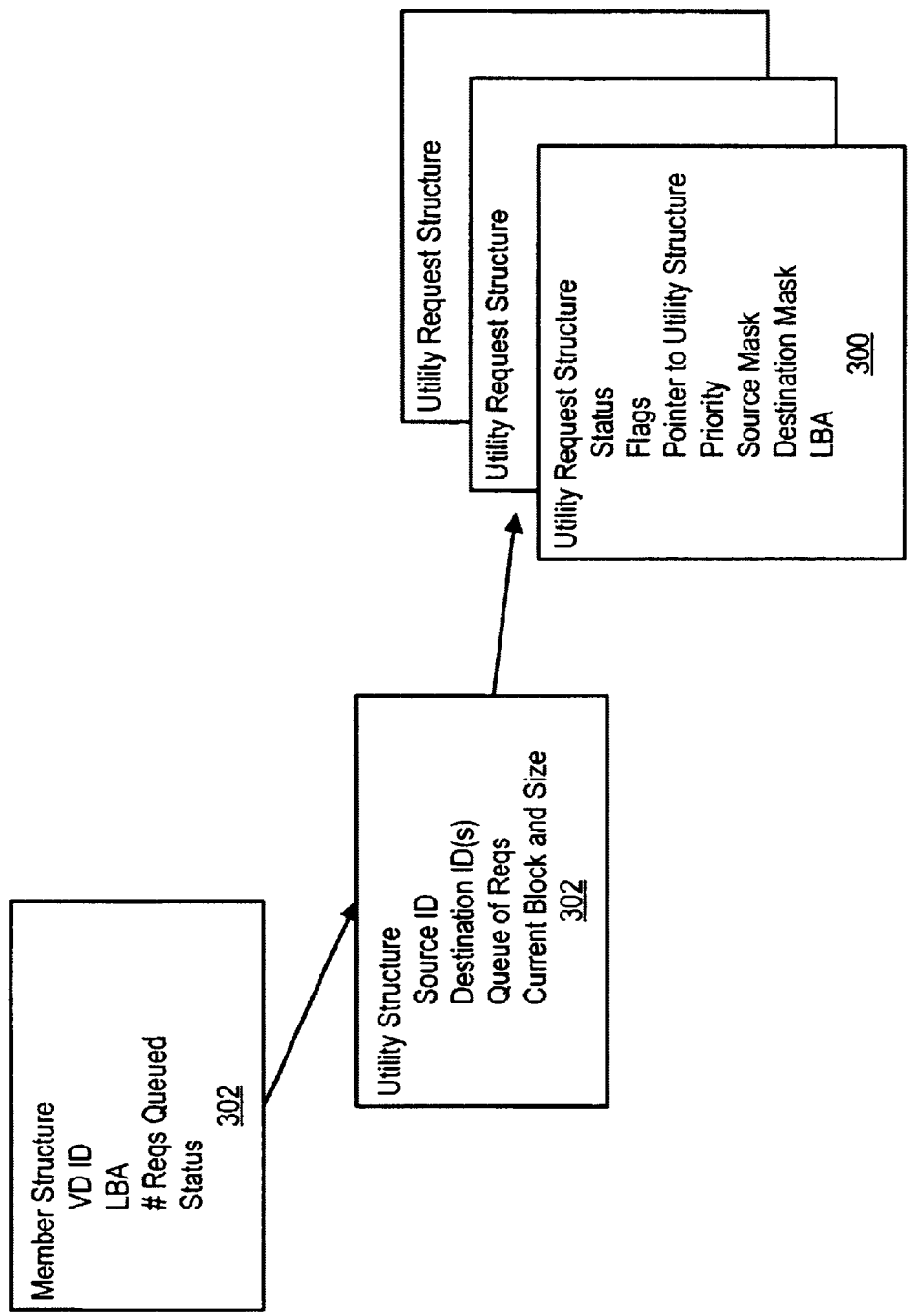
FIG. 28 illustrates data structures used in one example of a driver implementing a hot copy process according to the present invention.

FIG. 28 shows basic data structures utilized in a hot copy process. A first structure 300 in is called a UTILITY REQUEST STRUCTURE. A second structure 301 is called a UTILITY STRUCTURE. A third structure 302 is called a MEMBER STRUCTURE. The MEMBER STRUCTURE 302 is set up to identify a particular virtual circuit and its status. The MEMBER STRUCTURE 302 includes parameters, such as a virtual circuit identifier (VD ID), a logical block address (LBA) holding a block number for a block of data currently being handled by the virtual circuit, a count of requests that had been queued for the virtual circuit, and a status parameter.

The UTILITY STRUCTURE 301 holds parameters relevant to a current utility being executed, in this case a hot copy utility. It stores parameters such as the identifier of a source data set SOURCE ID, an identifier or identifiers of a destination storage device or devices for the hot copy process DESTINATION ID(s), a queue of requests to be executed in connection with the utility, and parameters indicating the current block being handled, and its size.

The UTILITY REQUEST STRUCTURE 300 carries a request for the hot copy process, including a variety of parameters concerning the process. It includes, for example, a parameter indicating the status of the request STATUS, a variety of flags supporting the request, a pointer to a corresponding UTILITY STRUCTURE, a parameter indicating the priority of the request relative to input/output requests from the client processors, a source mask identifying the data set in the source, and a destination mask identifying a location in a destination device into which the hot copy process is to copy the data set. In one embodiment, there are a plurality of destination masks for a single hot copy request. Also shown in FIG. 28, a logical block address (LBA) is kept in the UTILITY REQUEST STRUCTURE, which is also kept in the MEMBER STRUCTURE, for a current block of data within the data set being handled.

To initiate a hot copy process, user input is accepted which causes creation of the UTILITY REQUEST STRUC- TURE. The persistent table storage in the storage server is updated with the structure, the status of the source and destination devices, and the virtual circuits associated with the data set are checked, the drivers are set up to initiate the hot copy process, and the status parameters are set in various data structures. The progress of the hot copy process is maintained in the persistent table storage in case of failures. In this case, the hot copy process may be restarted using other resources within the server, using the copy of the status information and data structures that have been stored the persistent table storage. The other drivers in the system, such as RAID monitors and alike are notified of the hot copy process. The request is queued for the MEMBER STRUCTURE.

Once the set up is complete, the input and output processes in support of the hot copy process are initiated. The relative priority of the input and output processes in support of the hot copy process determines the rate of progress for the hot copy process, in the condition that a client processor is executing input and output requests for the same data set. In the preferred system, input and output requests from the client processor are executed first. In the event that a block transfer in support of a hot copy process is being executed, when an input or output request from a client processor is received, then the block transfer is completed as an atomic operation, and then the client processor request is serviced. In alternative systems, other techniques can be used to manage the priority of the processes.

Figure 29:
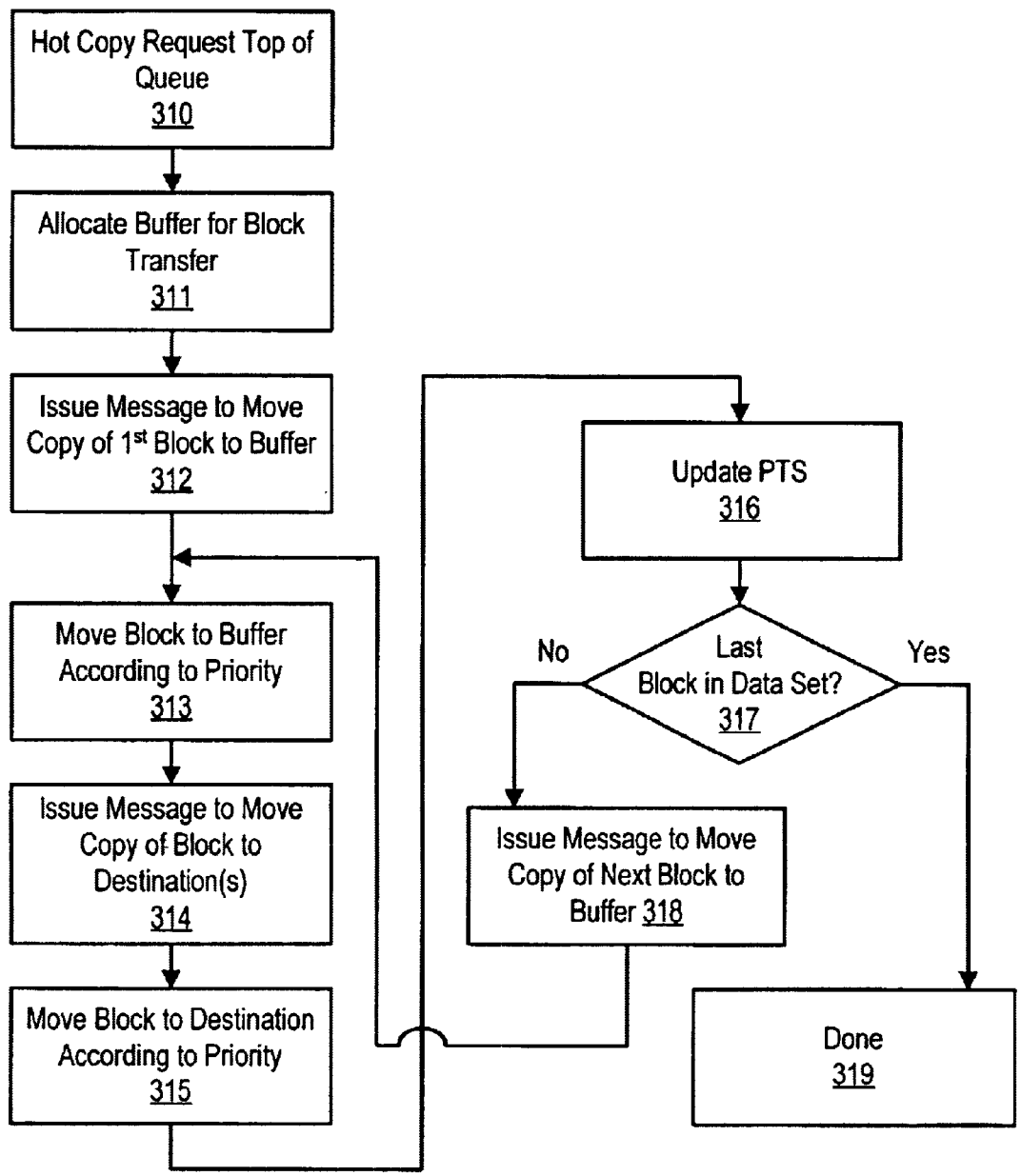
FIG. 29 is a flow chart showing a hot copy process executed by a driver according to the present invention.

The basic process for executing a hot copy is shown in FIG. 29. The process begins with a hot copy request reaching the top of the queue for the member structure (step 310). The process allocates a buffer in the storage server to support the block transfer (step 311). A message is issued to move a copy of a first block in the data set to the buffer (step 312). A current block is moved to the buffer according to the priority set for the hot copy process (step 313). The movement of the block is accomplished using appropriate memory lock transactions to control access by multiple processes within the storage server. Next, a message is issued to move a copy of the block from the buffer to the destination or destinations (step 314). The block is moved to the destination or destinations according to the priority for the hot copy process (step 315). Once the block is moved, the persistent table store and local data structures supporting the process are updated with status information indicating the progress of the hot copy (step 316). The process determines whether the last block in the data set has been copied (step 317). If not, then a message is issued to move a copy of the next block to the buffer (step 318). The process loops to step 313 to continue moving blocks of the data set into the destination or destinations. If at step 317, it was determined that the last block in the data set had been successfully moved to the destination or destinations, then the process is done (step 319).

According to one embodiment of the present invention, for a hot copy process involving multiple destinations, it is possible that a member or members of the group of destinations being used will fail during the process. In this case, the process can continue with the destination or destinations that continue to operate, updating the appropriate tables in support of the continued process.

Thus, a hot copy feature is used to copy a data set from one individual member that is not yet down to a replacement drive. The data set may include the entire contents of a storage device, or any part of the contents of a storage device. The hot copy feature can be used on RAID arrays of any level, with appropriate status and parameter management.

Hot copy parameters include the priority of process, the source member device, and a destination identifier. A hot copy request contains the source member identifier, the destination member identifier, the copy block size, and the copy frequency or priority. Hot copies are done according to the priority, and one block size at a time. The current block position is kept in array configuration data within data structures as discussed above. The hot copy process is done simultaneously with normal input and output processes. Writes to the drive being hot copied are written to both drives. In this way if the hot copy is aborted or fails, the original source member is still valid. When a hot copy completes, the original source member is removed from the array and designated as not usable by system manager programs. Likewise, in one embodiment, the virtual device supporting the data set is updated to point to the new destination.

Figure 30:
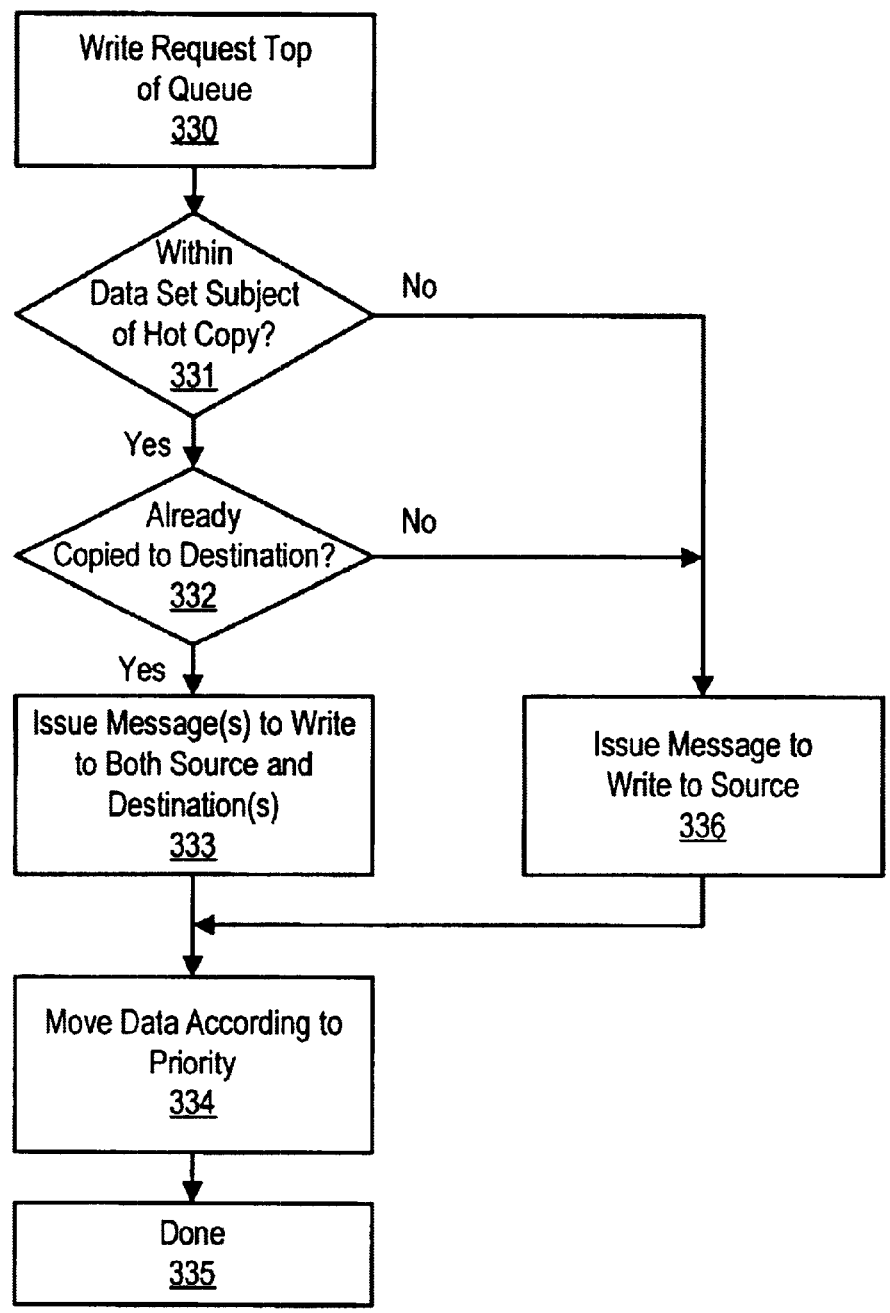
FIG. 30 is a flow chart illustrating handling of a write request during a hot copy process.
Figure 31:
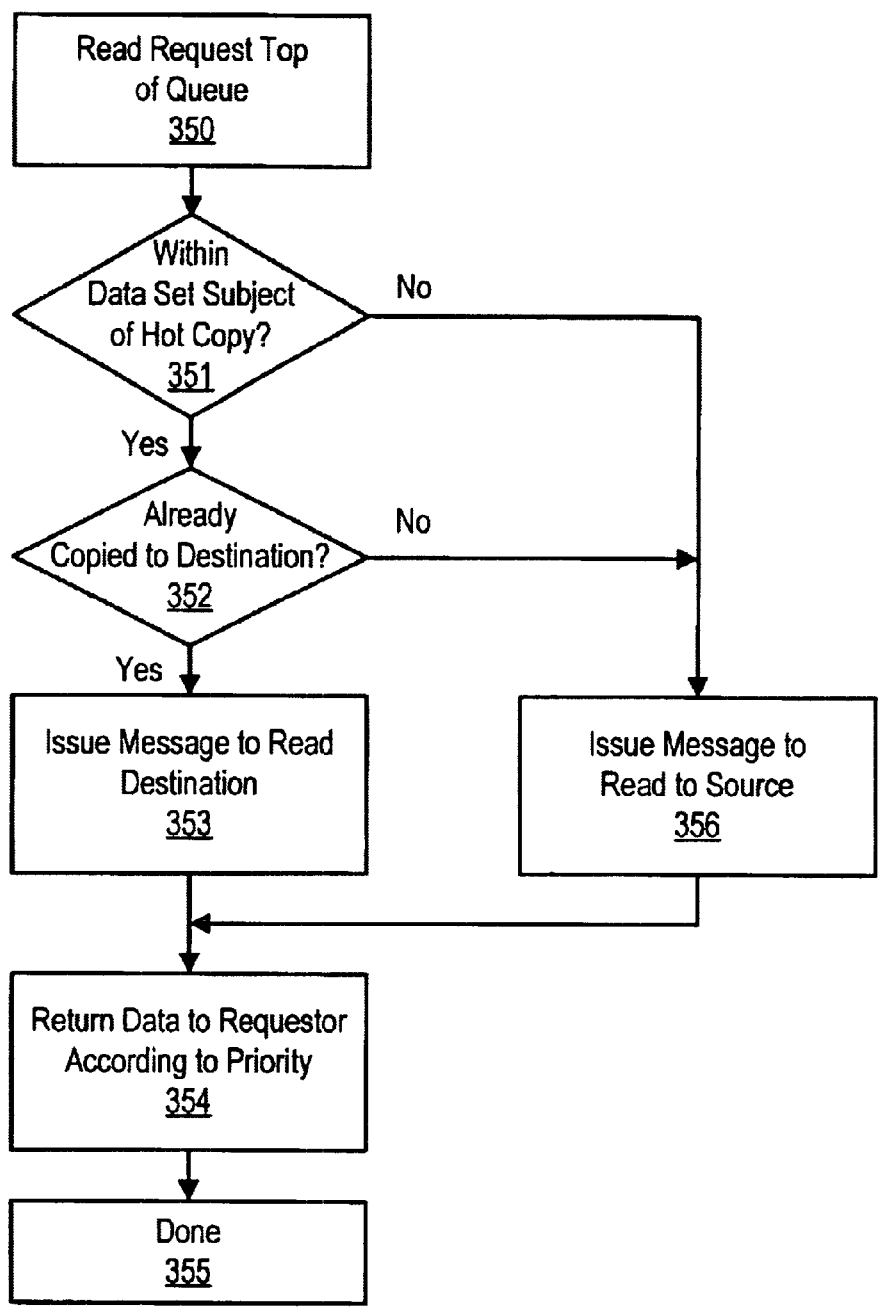
FIG. 31 is a flow chart illustrating handling of a read request during a hot copy process.

FIGS. 30 and 31 illustrate processes executed in the storage server to manage data access requests issued by client processors while a hot copy process is being executed. The data access requests may have one of a plurality of types, including read requests and write requests, and variations of the same. Other requests include requests supporting management of the data channel, and the like. In FIG. 30, one process for handling a write request is illustrated.

When a write requests reaches the top of the queue, the process begins (step 330). The process determines whether the write request identifies a location within the data set subject of a current hot copy process (step 331). If it is within the data set being hot copied, then the process determines whether the block within which the write request is directed has already been copied to the destination (step 332). If it has been copied, then a message is issued to write both to the storage device in which the data set was originally held and to the destination storage device or devices (step 333). Next the data is moved according to the priority for the input and output request (step 334), and the process is done (step 335).

If at step 331, the request was not within the data set, then the message is issued to execute the write to the source of the data set (step 336). The process flow moves to step 334 at this point. Likewise, if at step 332, it is found that the location subject of the write had not already been copied, then the message is issued to write to the source device (step 336).

FIG. 31 illustrates the handling of a read request that occurs during a hot copy. The process begins when the read request reaches the top of the queue for the virtual device (step 350). The process first determines whether the read falls within the data set subject of the hot copy (step 351). If the read falls within the data set, then the process determines whether the read falls within a block already copied to the destination or destinations (step 352). If the read is found within a block already copied to the destination, then a message issued to read the data from the new location (step 353). In an alternative system, the read may be executed from the source device, or from both the source and the destination devices, depending on the reliability, speed, and other factors affecting management of the data traffic within the system. After step 353, the data is returned to the requestor according to the priority for the client processor data access request (step 354). Then, the process is done (step 355).

If at step 351, it is determined that the read request is not within the data set subject of the hot copy, then the message is issued to read the source device (step 356). Likewise, if at step 352, it is determined that the read request addresses a block not yet copied to the destination, then the message is issued to read the data from the source device (step 356). After step 356, the process returns to step 354.

In the event that a read or write request to data within a particular block occurs while the block is in the process of moving through the storage server buffer, then data lock algorithms are used to manage handling of the requests. Thus for example, if a logical block is locked in support of the hot copy process while a read or write requests is received, then the client processor will receive notification that the read or write request was refused because the data was locked. In alternative systems supporting a higher priority for the client processor, the read or write request may be allowed to continue, while the block held in the buffer in support of the hot copy is deleted, and the status of the hot copy is reset to indicate that the block has not been moved. A variety of other data lock algorithms could be utilized as needed for particular implementations.

Target Emulation

In the configurations shown in FIGS. 1, 2, and 3, the storage server acts as an intermediate device between users of data, and storage devices in the storage domain which store the data. In this environment, in order to support legacy storage devices, that is, those devices in place before the server is inserted as an intermediate device, the server is provided with resources for emulating the legacy storage device. In this manner, when the server is inserted between the legacy device and the user of the data, the server virtually assumes the logical address of the legacy device according to the storage channel protocol being used between the user and the legacy device. The storage server then acts to respond to all requests according to that protocol which it receives that are addressed to the legacy device. Furthermore, the storage server retrieves such configuration information as needed from the legacy device, and stores the information in local memory so that status and configuration information that the user has been configured to expect in the legacy device is provided using local resources in the server. This saves communication between the server and a legacy device, and allows the server to spoof the action of the legacy device according to the storage channel protocol, so that re-configuration of the user is either not necessary or much simplified upon addition of the server to the storage network.

Figure 32:
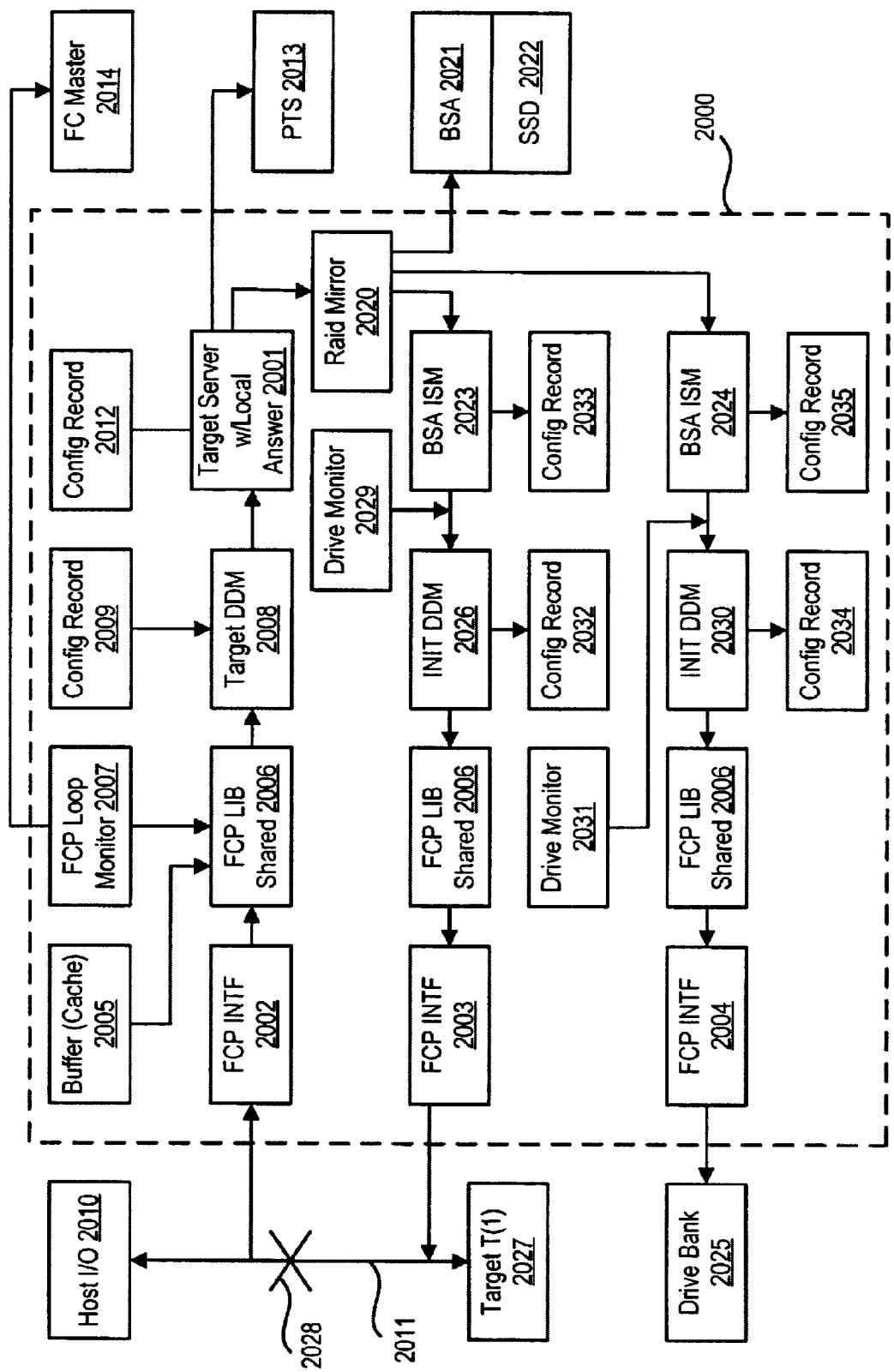
FIG. 32 is a diagram illustrating a virtual circuit in an input/output processor on a storage server, including the local answer capability of the present invention.

FIG. 32 illustrates a virtual circuit according to the present invention implemented using an input/output processor 2000 that combines a network interface (NIC) and a RAID controller interface (RAC) on single card. In this embodiment, a target server 2001 includes or is coupled with local answer routines according to the present invention.

In operation, the target server 2001 emulates the target 2027 to preserve the configuration of the host 2010 as much as possible. Thus the configuration record 2012, or other record in the system coupled to the interface to host 2010, includes a flag indicating that the target server 2001 has been mapped to a legacy device. In this case, incoming storage channel commands are monitored. All commands which can be answered locally are handled using locally stored data about a legacy device. Read and write commands are passed through to the legacy device 2027, or to such other device as is configured as part of the virtual circuit assigned to the logical address of the legacy device.

When a storage channel command is received at the target device driver module 2008, it is transferred to the target server 2001 for the assigned virtual circuit. The target server 2001 recognizes all commands which are not read or write commands, and processes them by access to the persistent table store 2013. Thus, the command is translated into a command which can be managed by the persistent table store 2013, the appropriate data is gathered from the table data stored for the target device, and returned to the host 2010. In alternative embodiments, the responsibility for responding to local answer commands is placed in the drive monitor, such drive monitor 2029, assigned to the legacy device.

For devices using the SCSI command set, commands such as MODE SENSE, MODE SELECT, READ CAP, INQUIRY, and REQ SENSE are managed using the local answer resources discussed above.

For legacy devices having tape drives, or SCSI Enclosure Services (SES) support, commands addressed to the tape drives or the SES support are passed directly to the initiator device driver module 2026, rather than supplied to the RAID mirror 2022 or the BSA ISM 2023.

In alternative systems, emulation for tape drives and SES support is provided as well. For example, profile data normally provided by the SES can be stored for use by the target server on the storage server. The profile data can be set to values which allow the host device to consider that the target remains operating normally, even if the virtual circuit is directing the storage operations to completely different devices. Also, the profile data can be generated using routines that access actual devices used by the virtual circuit, and then reconfigured for a response according to the SES protocol.

The sequential access protocols of tape drives can also be emulated using software routines which reconfigure data gathered from the storage devices used in the virtual circuit into formats expected by the host in communication with a legacy tape drive.

Figure 34:
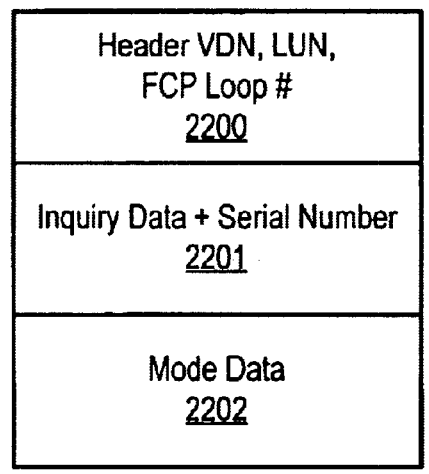
FIG. 34 is a simplified diagram of an entry in a persistent table store for use in the local answer process.

In a preferred embodiment, the persistent table store 2013 for each legacy device, stores target server data tables, such as shown in FIG. 34. The data tables include a header field 2200 coupled with an inquiry data field 2201 and a mode data field 2202, for systems supporting protocols using a command set compliant with the SCSI storage channel protocol. The header will carry the logical address including the virtual device number, the LUN number and the fibre channel protocol loop number of the legacy device. The inquiry data and serial number field 2201 carry data needed to respond to the inquiry command. The mode data fields carry data needed to respond to the mode page request commands in the SCSI protocol.

Figure 33:
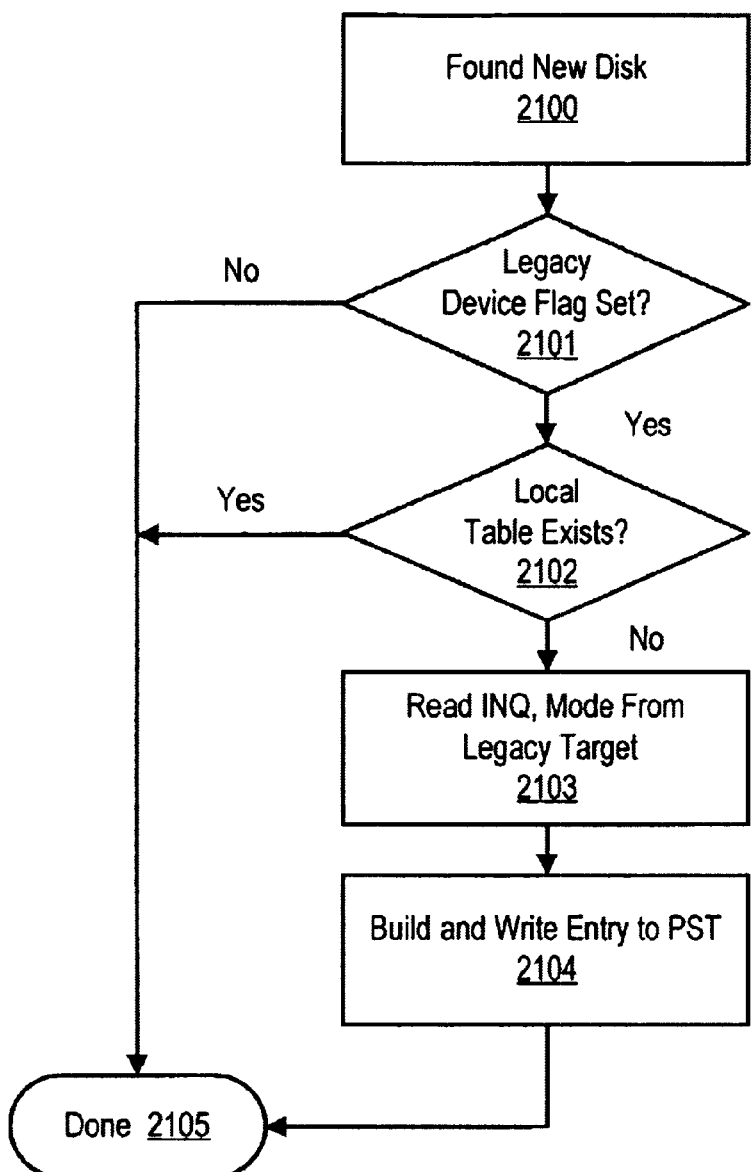
FIG. 33 is a flow chart illustrating a routine for building entries in the persistent table store for use in the local answer process.

The data is provided to the persistent table store 2013 by configuration routines. In a preferred system, the configuration data is gathered automatically. Routines for gathering the data are implemented by any device which is coupled to the virtual circuit. Thus in one example, the drive monitor 2029 includes a routine such shown in FIG. 33. According to this routine, when the drive monitor detects a new disk, such as on start up of the server, or hot addition of a device (step 2100), it looks at the configuration data for the target server to determine whether a legacy device flag is set (step 2101). If the flag is not set, the routine is done (step 2105). If the flag is set, then the routine determines whether a local table for the legacy device logical address has been set up in the persistent table store (step 2102). If the table already exists, then the routine is done (step 2105). If the table does not exist, then the initiator DDM 2026 is utilized to read the serial number, inquiry and mode data, or such other data as needed to manage emulation, from the legacy device 2027. Alternatively, substitute or default data can be used to build the table. In response to the read process, the entry in the persistent table store is built and written (step 2104). At that point, the process is done (step 2105).

In alternative configurations, support for legacy devices can be provided in a specialized device driver modules combining the target server and drive monitor functions described above. Also, other software and hardware configurations can be used for implementation of these routines.

To support the emulation of the target device, the storage server reads current drive information from the legacy storage device, and migrates the information into a local store accessible to the target server 2001. The information provided includes inquiry strings, target device capacity, mode pages, target identifiers and logical unit numbers, such other information as can be used to support the particular storage channel protocol be used. This allows the host to see the same storage picture through the storage server, as would appear if the legacy device remained directly connected to the storage network, or to the host.

Conclusion

The Importance of Storage Domain Management

Storage area networking (SAN) is a new storage centric-computing architecture. Driven in large part by the availability of Fibre Channel-based storage subsystems and network components, SANs promise high-speed data access and movement, more flexible physical configuration, improved utilization of storage capacity, centralized storage management, online storage resource deployment and reconfiguration, and support for heterogeneous environments.

In the older "direct attach storage" model, storage resources had a high-speed direct physical path to only a single server. All other servers had much lower speed access to that storage resource only indirectly through the LAN. Storage area networks change that by providing direct high-speed access paths (through the Fibre Channel) from every server to every storage resource in a "networked" topology. The introduction of a network architecture also significantly improves storage configuration flexibility, de-coupling storage resources from a particular server and potentially allowing them to be managed or configured with minimal impact on server-side resources.

While SANs provide the right topology to address the flexibility and data access requirements in today's environment, the SAN topology by itself does not adequately address the business issues. Merely providing the physical connections between servers and storage resources through SAN fabric components such as switches, hubs or routers is not sufficient to achieve the full promise of SANs, but the SAN fabric does provide the hardware infrastructure on which to layer the needed secure, centralized storage management capability. These two developments, deployed together, can provide the flexibility and ubiquitous access to essential data that it must offer to meet business goals in the new environment.

The management capability needed to layer on top of the SAN hardware infrastructure is Storage Domain Management. In order to achieve optimal storage flexibility and high performance access, storage domain management is most efficiently located within the SAN itself, rather than in either servers or storage devices. Server-based and storage-based resource approaches are suboptimal in that they do not adequately support heterogeneity on both the server and storage side.

Storage domain management is a centralized and secure management capability that layers on top of the existing SAN hardware infrastructure to provide high performance, high availability and advanced storage management functionality for heterogeneous environments. The purpose of storage domain management is to form the core of a robust SAN fabric that can integrate legacy and new equipment, offload SAN and storage management tasks from the servers and storage resources, and host SAN-based applications that can be leveraged across all SAN components. A SAN can be built without using storage domain management, but to create and manage an optimized heterogeneous SAN environment requires this crucial management capability.

The fundamentals of Storage Domain Management include:

Heterogenous interoperability;

Secure, centralized management;

Scalability and high performance;

Enterprise-class reliability, availability and serviceability;

An intelligent, purpose-built platform.

The discipline of storage domain management will enable customers to realize the full promise of SANs to address business problems.

With all the server and storage consolidation, as well as the mergers and acquisitions common in today's new business climate, heterogeneity is a fact of life in enterprise environments. A set of products that provides SAN functionality for a single vendor's product line is not sufficient for customers to achieve the full promise of SANs. Customers need an ability to preserve investment in legacy equipment even as they add and take advantage of new server and storage products, and therefore a storage domain manager must support Fibre Channel and SCSI attachment at a minimum. Because the storage domain manager will need to evolve over time to accommodate newer technologies as they are introduced, the platform is able to provide a well-defined growth path to more extensive multi-protocol connectivity over time.

SANs create a large, virtualized storage pool that can be managed centrally to minimize storage management tasks relative to the traditional "direct attach" storage architecture, particularly in the areas of backup/restore and disaster recovery. Because SANs effectively provide a physical access path from all servers to all storage, but all storage should not logically be accessible to all servers, security must be addressed in a robust manner. SAN fabric vendors do this through the logical definition of "zones", with each server only able to access data defined as being within its zone. Clearly, the ability to define secure zones, or storage "domains", is one aspect of a storage domain manager. Improved granularity of domain definition, such as defining inclusion within a zone at the LUN level rather than at the port level, offers significant additional flexibility in improving storage asset utilization over time.

The storage domain manager offers a comprehensive set of centralized storage management capabilities that can be leveraged from a single management interface, across all attached servers and storage, regardless of vendor. From a central location, a system administrator may control the movement or mirroring of data between heterogeneous storage resources, and can dynamically leverage these capabilities across different heterogeneous storage resources over time. This results in a significant cost savings and simplification of administrative complexity. As a scalable, intelligent platform, the storage domain manager resides in the perfect central location to host storage management functionality that can be leveraged across all attached server and storage resources.

Given the storage growth rates driven by the new business climate, a specific SAN environment may easily grow two orders of magnitude in storage capacity during its lifetime. As the point of central intelligence in the SAN, a storage domain manager is able to accommodate a significant amount of growth without load-related performance degradation. Intelligence should be added as configurations grow to ensure smooth, cost-effective scalability over a wide performance range.

An ability to cache significant amounts of data in the intelligent platform optimizes the SAN configuration to achieve performance improvements in application specific environments. For example, if "hot spots" such as file system journals and database-table indexes or logs can be cached in high-speed storage in the storage domain manager itself, this significantly minimizes message path latencies relative to more conventional SAN configurations built without a storage domain manager. Given a sufficient amount of onboard storage, entire databases and file systems can effectively be cached to achieve large performance improvements. The onboard storage capacity is also important to stage data during migration and other data movement tasks.

As mentioned earlier, one of the key reasons for moving to a SAN is to improve overall data accessibility. If single points of failure are introduced as a result of the move to this new storage architecture, many of its potential benefits may not be realized. For this reason, not only the data itself but the access paths to that data must be available at all times. Minimizing downtime due to failures must be addressed through the use of relative internal components and capabilities such as automatic I/O path failover, logical hot sparing and pluggable, hot swappable components. Downtime must be further minimized through online management capabilities such as online firmware upgrades, dynamic hardware and software reconfiguration and high-performance background data movement.

To ensure the highest levels of performance, the preferred storage domain manager is an intelligent, purpose-built platform specifically optimized for the storage-related tasks demanded of it. This platform supports significant local processing power to perform a wide range of storage management tasks, backed by the local high speed storage necessary for data movement and storage management application execution.

In comparison with a general-purpose platform being used as an intelligent storage server, a purpose-built platform offers a real time operating system for much faster and more deterministic response time, more efficient I/O path code to minimize message latencies and an operating system kernel optimized as a data mover engine rather than an application engine. This purpose built platform supports kernel-level features not available in a general-purpose operating system, such as reliable, deterministic message delivery. High availability features such as integrated path failover, online management and dynamic reconfiguration, are supported by the core operating system. By providing intelligence in the optimal location to support heterogeneous SAN environments, the storage domain manager delivers the following business benefits to end users:

Improved storage asset allocation and utilization;

The flexibility to cost-effectively accommodate dynamic, high growth storage environments;

Higher availability through online management and configuration;

More efficient management to lower the overall $/GB costs of storage administration;

An ability to consolidate heterogeneous servers and storage in an integrated SAN environment;

Increase the value of JBOD storage by adding storage management and caching features that can be dynamically leveraged across all storage resources.

A robust SAN hardware infrastructure concurrently deployed with the discipline of storage domain management, provides the flexibility to accommodate an environment of rapid, unpredictable change while still providing secure, high-speed access to highly available data. The resulting centralized storage management paradigm is a more efficient, less costly way to manage the growth of the data that drives competitive advantage for the enterprise.

The foregoing description of various embodiments of the invention have been presented for purposes of illustration and description. The description is not intended to limit the invention to the precise forms disclosed. Many modifications and equivalent arrangements will be apparent to people skilled in the art.

What is claimed is:

1. A method for configuration and management of storage resources in a storage network, comprising:

installing an intermediate system in the storage network between clients and storage resources in the storage network;

assigning logical storage extents to clients in the storage network using logic in the intermediate system;

assigning storage resources in the storage network to logical storage extents using the intermediate system; and routing storage transactions through the intermediate system according to the logical storage extents assigned to the clients, and according to the storage resources assigned to the logical storage extents, the routing including executing respective channel protocols carrying information sufficient to identify a client served by a storage transaction; and routing storage transactions within a storage domain in response to the client served by the storage transaction.

2. The method of claim 1, including caching data involved in storage transactions in said intermediate system.

3. The method of claim 1, wherein said assigning storage resources includes configuring said storage resources in the network to the logical storage extents using a graphical user interface at the intermediate system.

4. The method of claim 1, wherein said routing includes directing storage transactions within the storage domain using resources in the intermediate system.

5. The method of claim 1, wherein the intermediate system manages migration of data between storage devices in the network, in a manner transparent to the clients.

6. A method for configuration and management of storage resources in a storage network, comprising:

defining a storage domain by assigning logical storage extents to clients in the network and assigning storage resources in the network to logical storage extents; and routing storage transactions in the network according to the storage domain the routing including executing respective channel protocols carrying information sufficient to identify a client served by a storage transaction; and routing storage transactions within a storage domain in response to the client served by the storage transaction.

7. The method of claim 6, including caching data involved in storage transactions at an intermediate position between the clients and the storage resources.

8. The method of claim 6, wherein said defining a storage domain includes configuring said storage resources in the network to the logical storage extents using a graphical user interface at an intermediate position between the clients and the storage resources.

9. The method of claim 6, wherein said routing includes directing storage transactions within the storage domain using resources at an intermediate position between the clients and the storage resources.

10. The method of claim 6, including providing resources in an intermediate position between the clients and the storage resources to manage migration of data between storage devices in the network, in a manner transparent to the clients.

* * * * *